US005842615A

United States Patent [19]

Goodness

[11] Patent Number: 5,842,615

[45] Date of Patent: Dec. 1, 1998

[54] VEHICLE RACK SYSTEM

[76] Inventor: Daniel E. Goodness, 2260C County Highway G, Nekoosa, Wis. 54457

[21] Appl. No.: 777,937

[22] Filed: Dec. 23, 1996

[51] Int. Cl.$^{6}$ .......................... B60R 9/00

[52] U.S. Cl. .......................... 224/509; 224/485; 224/519; 224/917.5; 224/924

[58] Field of Search .......................... 224/509, 511, 224/518, 519, 520, 502, 282, 485, 488, 495, 917.5, 924

[56] References Cited

U.S. PATENT DOCUMENTS

| | | | |
|---|---|---|---|
| 3,326,434 | 6/1967 | Cheadle | 224/42.21 |
| 3,753,520 | 8/1973 | Bodde . | |
| 3,804,308 | 4/1974 | Bodde . | |
| 4,002,364 | 1/1977 | Eshelman | 293/67 |
| 4,088,253 | 5/1978 | Saffold . | |
| 4,282,994 | 8/1981 | Hilliard . | |
| 4,434,922 | 3/1984 | Brandsen et al. | 224/314 |
| 4,561,575 | 12/1985 | Jones | 224/42.21 |
| 4,676,414 | 6/1987 | Deguevara . | |
| 4,863,080 | 9/1989 | Graber . | |
| 4,875,608 | 10/1989 | Graber . | |
| 4,946,084 | 8/1990 | Britto | 224/42.21 |
| 4,948,021 | 8/1990 | Murphy et al. | 224/42.13 |
| 5,004,133 | 4/1991 | Wyers . | |
| 5,094,373 | 3/1992 | Lovci | 224/509 |
| 5,096,102 | 3/1992 | Tolson | 224/917.5 |
| 5,108,020 | 4/1992 | Patrick et al. | 224/319 |
| 5,181,822 | 1/1993 | Allsop et al. | 414/462 |
| 5,232,135 | 8/1993 | Marren | 224/509 |
| 5,277,346 | 1/1994 | Stier | 224/509 |
| 5,439,151 | 8/1995 | Clayton | 224/509 |
| 5,449,100 | 9/1995 | Eckhart | 224/509 |
| 5,518,159 | 5/1996 | DeGuevara | 224/488 |

OTHER PUBLICATIONS

Fall 1996 Catalog "Performance Products", pp. 18, 19, and 21 from Performance Products, 7658 Haskell Avenue, Van Nuys, California, 91406.

Graber USA 1996 Catalog, entire catalog, Graber USA, 5253 Verona Road, Madison, Wisconsin 53711.

Thule Car Rack Systems 1996 Catalog, pp. 10 and 11, Thule, 42 Silvermine Road, Seymour, Connecticut, 06483.

*Primary Examiner*—Renee S. Luebke
*Attorney, Agent, or Firm*—Nilles & Nilles, S.C.

[57] ABSTRACT

A modular vehicle rack system having a rack holder and rack constructed and arranged to allow easy interchange of racks on the rack holder while allowing a rack mounted on the rack holder to be swung away from the rear of a vehicle to provide substantially unobstructed access to the vehicle rear. The holder has an upwardly extending pin located away from a tongue of the holder that telescopically receives a complementary sleeve of the rack enabling a rack to be quickly and easily mounted on the holder in a manner that permits it to be swung away from the vehicle rear to provide access. The rack preferably includes an integral handle that permits it to be easily grasped and maneuvered to enable racks to be quickly and easily mounted on or removed from a holder. The rack construction includes a swing arm support rail forming part of a cargo or equipment truss that can be flexibly arranged to carry many types of equipment and cargo making the rack design extremely flexible and versatile. One preferred rack embodiment includes an article retainer having a pair of spaced apart pegs that retains an article received between the pegs by a cap that engages the pegs. The axial location of the cap on the pegs can be adjustably varied to accommodate articles of different sizes and width between the pegs.

50 Claims, 16 Drawing Sheets

76
122
118
98
164
100
120
46b'
96
62'
58
46a'
44'
166
102
106
94
108
112
54
50
84
82

VEHICLE RACK SYSTEM

FIELD OF THE INVENTION

This invention relates to an equipment rack for a vehicle and more particularly to a rack holder constructed to receive interchangeable racks with each rack designed to carry a different load or type of article.

BACKGROUND OF THE INVENTION

Many kinds of equipment or cargo carriers for automotive vehicles have been constructed for carrying skis, bicycles and the like. However, most of these carriers are racks that are extremely limited in that they are designed to carry only one type of article. For example, U.S. Pat. Nos. 5,449,100 and 5,108,020 disclose a rack that can only carry skis on a vehicle. Likewise, U.S. Pat. Nos. 5,004,133; 4,948,021; 4,875,608; 4,863,080; and 4,088,253, each disclose a rack that can only carry bicycles.

As a result of the incredible variety of activities undertaken by active people today, these single type of use racks and carriers are not particularly cost effective nor convenient. For skiers who like to bicycle, or bikers who like to ski, who have purchased any of these types of single use carriers, two completely different racks must be disadvantageously purchased at extra unnecessary expense. When not in use, each rack takes up space and the bikes or skis each rack is designed to carry must be stored separately from the rack undesirably taking up even more storage space.

Moreover, many people who are active skiers and bicyclers often participate in many other activities which require them to transport equipment by vehicle to the site that they will use the equipment. In many instances, racks for many of these other types of activities must be custom made at considerable additional expense or are simply unavailable.

The vehicle equipment racks disclosed in U.S. Pat. Nos. 5,181,822 and 5,094,373 attempt to remedy this problem by being modifiable such that they can carry bicycles or skis. Although the racks disclosed in these patents are more versatile, both of these racks are limited in that they can only carry objects which can be hung on a rather small and therfore capacity-limited rack structure, namely either only skis or only bicycles. Both of the racks disclosed in these patents can also be moved from a closed position where the rack is located directly behind the vehicle obstructing access to the rear of the vehicle to an open position that is located away from the rear of the vehicle to allow access to the rear of the vehicle, such as for loading articles into the rear of the vehicle or unloading articles from the rear of the vehicle.

Unfortunately, the rack disclosed in the ’822 patent is displaced directly outwardly away from the rear of the vehicle in a manner that does not permit completely unobstructed access to the rear of the vehicle. This is because the rack pivots outwardly away from the vehicle in a direction that is generally parallel to the longitudinal axis of the vehicle when the rack is being moved away from the closed position to an open position. As a result of this rack construction, in some instances, such as when loading or unloading a particularly large object into or from the vehicle, the rack may have to be undesirably completely removed from the vehicle before the loading or unloading can be done.

The rack disclosed in the ’373 patent attempts to remedy this further shortcoming by being constructed such that it can be swung away from the rear of the vehicle from adjacent one side of the vehicle to allow substantially completely unobstructed access to the vehicle rear. The rack disclosed in the ’373 patent has a lower support arm that extends at a right angle from a tongue that attaches the lower support arm to a vehicle. The rack also has a horizontal upper support arm with one end that overlies the tongue and another end that overlies the free end of the lower support arm. To permit the upper support arm to be swung away from the rear of the vehicle, the upper arm is pivotally attached to the lower support arm by a nut and bolt fastener arrangement that positively connects the two support arms together in a manner such that the upper arm cannot be removed from the lower arm without first removing the fastener.

The equipment is carried by a rather small rack attachment that is attached to a single vertical shaft that extends upwardly from the end of the upper arm that overlies the tongue when the upper arm is in the closed position. Each sports equipment rack attachment is designed either to hold bicycles or skis while the attachment is mounted to the vertical shaft and is not constructed to conveniently store the equipment when not mounted to the shaft.

The ’373 patent discloses a first removable rack attachment for carrying a bicycle, a second removable rack attachment for carrying skis and a third removable rack attachment for carrying fuel containers. Each type of rack attachment includes at least one hollow sleeve that is telescoped over the vertical shaft of the upper support arm and which must be held in place by a locking pin that engages both the sleeve and shaft to prevent the rack attachment from undesirably sliding down the shaft. To remove the equipment-carrying attachment, the locking pin is withdrawn and the sleeve is lifted upwardly until it clears the top end of the upper support arm shaft. Without the locking pin, which is a separate unconnected component, the attachment cannot be immovably secured to the upper support arm shaft and will not be properly located on the shaft.

In fact, without the locking pin, there is a danger that the sleeve will slide down the shaft so far that the equipment carried by the attachment will contact the ground possibly severely damaging or destroying the equipment or part of the rack. Therefore, should this locking pin ever become lost, broken, or otherwise disengaged, the equipment carried by the attachment can be damaged, destroyed or, just as bad, fall off of the rack attachment and become lost.

A further disadvantage to this rack design is that the load carrying capacity and ruggedness of the rack is limited. By connecting the equipment carrying attachment to the rack using only a locking pin, the load that can be carried by a rack of this construction is relatively small and limited in weight. Additionally, the single vertical shaft that supports the rack attachment means that only a single vertical shaft supports the entire weight of the equipment carried by the rack attachment also helping to limit the total equipment weight that can be carried by the rack. As a result of these factors, the rack and attachments disclosed in the ’373 patent are not well suited for carrying diverse and heavy payloads and carrying such loads over relatively rough terrain.

Moreover, the rack disclosed in the ’373 patent is inefficient to use. All of its rack attachments are designed simply to carry the equipment and are not designed for storing equipment when the attachment is removed from the rack. As a result, each time the equipment is to be transported and used, the corresponding rack attachment must be first attached to the rack and thereafter the equipment mounted on the rack attachment. When finished, the equipment must then be removed from the rack attachment before the attachment can be removed from the rack. As a result, the equipment must be stored separately from the equipment carrying attachment when the rack attachment is removed thereby undesirably increasing the amount of off-vehicle storage space required.

In addition to these disadvantages, the rack construction disclosed in the '373 patent, as well as other types vehicle racks, very nearly completely obstruct one or both taillights which can be very unsafe. Additionally, some of these commercially available racks obstruct the center taillight which is prohibited by federal law.

Finally, for business owners who rely on vehicles to transport equipment or deliver cargo to a remote site, the storage area of the vehicle itself many not be enough or may not be conducive to keep certain kinds of equipment or cargo separate and organized from other types of equipment or cargo used in the business. Often these business owners also have families that participate in recreational activities, such as, for example, skiing or bicycling. It is not heretofore known of a rack system that allows racks of different constructions and uses to be quickly and easily interchanged on a rack holder or rack base that attaches directly to a vehicle while permitting the rack carried by the rack holder to be swung away from the rear of the vehicle to provide unobstructed access to the rear of the vehicle.

What is needed is a modular equipment rack system that can accommodate a variety of rack modules for carrying both sports equipment, other equipment and cargo. What is also needed is a heavy duty robust equipment and cargo rack system that is durable and which uses rack modules that will not expose the equipment or cargo carried by the rack to harm while being transported by a vehicle, even over rough terrain. What is further needed is a modular equipment rack system that can support a great deal of weight so that equipment rack modules for a wide variety of applications can be used. What is still further needed is a modular equipment rack system that uses equipment racks which can be used to hold or store the equipment when removed from a base of the rack without requiring the equipment to be removed when the rack module is removed from the rack holder. What is also needed is a rack construction which does not obstruct any vehicle taillight and which locates equipment away from any vehicle taillight.

SUMMARY OF THE INVENTION

A modular rack system for a vehicle that allows racks to be easily and quickly interchanged on a rack holder. The modular rack and rack holder preferably are constructed and arranged to permit a modular rack mounted on the rack holder to be swung between a closed position where the rack is behind the vehicle and an open position that permits access to the rear of the vehicle carrying the rack and rack holder while also permitting the rack to be easily removed so another modular rack can be quickly and easily mounted on the rack holder. When in an open position, a hatch, rear door, tailgate or trunk lid of the vehicle can be opened and the interior of the vehicle accessed without obstruction by the rack or the rack holder. When it is desired to change racks, the rack carried by the rack holder is simply lifted off of the rack holder and another rack is lowered onto the rack holder to positively and securely mount the rack on the rack holder.

The rack holder has a tongue for releasably engaging a hitch connection of the vehicle that preferably is a hitch receiver or ball-type hitch that has the hitch ball removed. Generally perpendicularly outwardly extending from the tongue is a rack holder base that has one end which extends beyond the tongue toward the driver side of the vehicle and has an opposite end that extends beyond the tongue in the other direction toward the passenger side of the vehicle. Preferably, the rack holder base is an elongate beam having one end that extends outwardly from the tongue toward the passenger side of the vehicle and its other end which extends outwardly in the opposite direction from the tongue toward the driver side of the vehicle.

Carried by the rack holder base is a rack receiver that preferably mates with a rack coupler of the rack to enable the rack to be releasably mounted on the rack holder while also permitting at least a portion of the rack to be displaced outwardly away from the rear of the vehicle. Preferably, the rack receiver and rack coupler are constructed and arranged to permit the rack to be removed from the rack holder by lifting the rack free of the holder while also allowing the rack to be swung away from the rear of the vehicle. Preferably, the rack receiver and rack coupler are constructed and arranged to permit the rack to be removed from the rack holder by lifting the rack upwardly relative to the rack holder until the rack coupler disengages from the rack receiver.

The rack receiver preferably is an upwardly extending pivot pin carried by the rack holder base which engages the rack coupler that preferably is a sleeve carried by the rack. Although the pin is preferably carried by the rack holder and the sleeve carried by the rack, the rack and holder can be constructed such that the sleeve is carried by the rack holder base and the pin is carried by the rack.

The pivot pin preferably is located at or adjacent one end of the rack holder base and the sleeve of the rack is also located at or adjacent a corresponding end of the rack. Preferably, the span of the base, the distance from the tongue to the end of the base receiving the pin, and the location of the pin on the base relative to one side or the other of the vehicle are selected to allow the rack to be mounted on the rack holder such that when it is swung away from the closed position, where the rack is located directly behind the rear of the vehicle, toward an open position that is disposed away from the closed position and away from the rear of the vehicle, access to the rear of the vehicle is substantially unobstructed and preferably completely unobstructed.

The rack receiving pivot pin is carried by the rack holder and is located to one side of the tongue either toward the driver side or the passenger side of the vehicle when the rack holder is mounted to the vehicle. With the rack holder mounted to the vehicle, the pin extends generally upwardly from the rack holder base. Preferably, the pin has a diameter and length sufficient to support the weight of the rack when swung away from the closed position such that the rack is cantilevered from the pin.

Preferably, the pin has an outer diameter of at least about one-quarter inch, extends above the rack holder in a generally vertical direction at least about two inches and is anchored to the rack holder such that at least a portion of the pin extends into the rack holder. Preferably, the pin diameter is between about one-quarter inch and about two inches and the pin extends above the rack holder between about ten inches and about twenty inches. In a preferred embodiment, the pin diameter is about one inch and the pin extends upwardly from the rack holder base about eighteen inches.

Preferably, the pin is anchored to the rack holder by the pin being welded or otherwise affixed to the rack holder where the pin contacts the rack holder base. Preferably, the pin is affixed or welded to the rack holder where it enters the rack holder base. Preferably, the pin is further anchored to the rack holder by having a portion of the pin received inside the rack holder base and which is affixed or welded to the rack holder base a distance from where the pin enters the rack holder base thereby anchoring the pin to the rack holder in two places that preferably are axially spaced apart from each other along the pin. In this manner, the pivot pin can support a rack cantilevered from the pin and articles carried by rack having a weight as much as fifty pounds or more and which can have a weight of as much as one-hundred twenty pounds or more.

Preferably, an end of the pin is received in the rack holder base and is anchored to the rack holder base by a first weld where the pin enters the base and is also anchored to the rack holder base by a second weld at a point disposed from the first weld. Preferably, the pin is anchored to the rack holder base by a second weld that is located at or adjacent the bottom of the rack holder base. Preferably, the end of the pin extends into the rack holder base to adjacent the bottom of the rack holder base and is welded to the rack holder base adjacent the bottom of the base and adjacent the end of the pin to join the base to the bottom of the pin.

If desired the pivot pin and rack holder can be constructed such that the pin extends completely through the rack holder base with one end extending upwardly of the rack holder base and another end which extends below the bottom of the base. In this rack holder construction, the pin preferably is welded to the rack holder where it enters the rack holder base at the top of the base and is welded to the rack holder base where it exits the rack holder base at the bottom of the base thereby anchoring the pin to the rack holder at two locations.

To further support the rack when cantilevered from the pin when the rack is swung away from the closed position, the rack holder can have a rack support arm which has a first end that extends from adjacent the lower end of the pin, a middle portion that extends outwardly from the first end toward the rack, and a second end on the middle portion which is attached to the rack a distance from the pin. To enable the arm to swing with the rack while supporting some of the weight of the rack and its contents, the pin has a groove forming a shoulder that pivotably receives a collar having a radially inwardly extending rib that is received in the groove. During operation, the interlocking shoulder of the pin and rib of the support arm permit the arm to rotate about the pin while also being able to transfer weight from the rack through the arm to the pin.

To retain the rack in the closed position, the rack holder also carries at least a portion of a latch assembly that is spaced from the pivot pin. In a preferred embodiment where a single rack is mounted on the rack holder, the latch assembly is located at or adjacent the end of the rack holder base opposite the pivot pin. In a second preferred embodiment where a pair of racks are carried by the rack holder, there preferably is a pivot pin at or adjacent each end of the rack holder and a pair of latches inboard of the pins which preferably are located adjacent the tongue and can be spaced outwardly of the tongue.

The latch and pivot pin also provide a support point which transfers the weight of the rack and its cargo to the rack holder. Where a single rack is carried by the rack holder, the location of the latch and pivot on the rack are selected such that the weight of the rack and its load are transferred to the rack holder base at one point on one side of the tongue and another point on the opposite side of the tongue for producing bending moments in the rack base about the tongue which oppose each other and preferably at least partially cancel each other out for producing a more stable rack and rack holder assembly.

Where a pair of racks are carried simultaneously by a single rack holder, the center of mass for one rack preferably lies on one side of the tongue and the center of mass for the other rack preferably lies on the other side of the tongue for creating opposing bending moments on either side of the tongue which at least partially cancel each other to produce a more stable dual rack and rack holder assembly. Preferably, each pivot pin of the dual rack rack holder provides a support point between a rack and the rack holder for transferring the weight of that rack and its cargo to the rack holder. Because a pivot pin is located on opposite sides of the rack holder, each rack carried on the holder transfers its weight to the rack on opposite sides of the tongue creating at least partially offsetting bending moments during use and operation.

In a first preferred latch assembly, the latch comprises a pedestal carried by the rack holder which has an aperture for receiving a latch pin carried by the rack. The latch pin preferably is attached by a bracket to the rack and is biased toward a latching position by a spring. The latch pin preferably has a handle that is manually grasped and pulled upwardly to unlatch the latch and release the rack from being retained in the closed position. Adjacent or integral with the pedestal is a land with a stop plate against which the rack bears when moved to the closed position to help support the rack and to prevent the rack from moving beyond the closed position further toward the vehicle when being moved toward the closed position.

When the rack is in the closed position, it rests upon the land transferring at least a portion of the weight of the rack and its cargo to the rack through the land. When the rack is in the closed position, the pedestal can be constructed also to contact the rack thereby supporting the rack such that at least part of the weight of the rack and its cargo are transferred to the rack holder through the pedestal. Therefore, when the rack is latched in the closed position, either the land or the latch pedestal or both provide a support point to the rack.

In a second preferred latch assembly, the latch has a generally C-shaped saddle that has a bottom wall that is a land upon which a portion of the rack rests when in the closed position, a rear wall that is a stop for preventing movement of the rack beyond the closed position, and a top wall for preventing the rack from moving upwardly relative the rack holder should a vehicle carrying the rack encounter a relatively severe bump or jolt. Preferably, the latch saddle is attached by a weld or otherwise affixed to the rack holder base.

To releasably retain the rack in the closed position, the latch further includes a lever arm attached to the latch saddle by a pivot. The lever arm has an inclined ramp portion that rides the swing arm truss as it enters the latch and an arcuate cutout that is a retainer notch which encircles a portion of the truss when the rack reaches the closed position. When the latch lever arm drops down encircling a portion of the rack that preferably is a generally horizontal swing arm rail of the rack, the retainer notch opposes movement of the rack away from the closed position. The front end of the lever arm is a handle that can be manually grasped to lift the lever arm upwardly to release the rack to allow it to moved away from the closed position.

Whether or not the rack is in the closed position, there is a support point between the rack and rack holder at the pivot pin. To facilitate free swinging operation of the rack on the holder while providing a point of support to the rack, the sleeve of the rack can directly bear against the base of the rack holder. Preferably, however, there is a bearing washer at the base of the pivot pin between the rack holder base and sleeve against which the axial end of the sleeve bears against or rests upon providing a support point between the rack and rack holder. The bearing washer preferably is an annular washer having a generally flat and smooth rack sleeve bearing surface for facilitating swinging of the rack about the pivot pin. The washer preferably also reinforces the rack holder base in the region of the pivot pin.

Preferably, the bearing washer is construction of a strong, resilient and friction reducing material such as iron, steel, aluminum, bronze, copper, nylon, teflon or one of these same materials impregnated with a lubricant. If desired, the bearing washer can be a steel, iron or aluminum coated or covered with a nylon or another elastomer, teflon, kevlar or the like to reduce friction between the rack and rack holder to better facilitate the swinging of the rack about the pivot pin.

Each modular rack preferably is constructed of a pivot pin receiving sleeve mounted to a swing arm truss that includes support framework designed to carry equipment or cargo. Preferably, the truss includes a generally horizontal elongate swing arm support rail that has a pair of spaced apart generally upstanding support posts that, in turn, support at least one generally horizontal equipment or cargo supporting cross beam from which at least some of the equipment or cargo is either hung or supported. Preferably, the cross beam is spaced upwardly of the truss and extends from one support post to the other support post connecting the two support posts together. If desired, an upstanding wall or support mesh can be attached to the support posts and cross beam for use in attaching equipment or cargo to the wall or support mesh.

To protect equipment or cargo carried by the rack and prevent cargo or equipment from falling off the rack onto the road, each rack preferably can be equipped with an outwardly extending platform carried by the swing arm truss that underlies the equipment or cargo. The platform preferably extends in a direction outwardly away from the rear of the vehicle when the rack is mounted on the rack holder in the closed position.

To enable a modular rack to be easily grasped, picked up and maneuvered, the sleeve is attached adjacent one end by a generally horizontal brace to the support post and adjacent its other end directly to the swing arm truss defining a handle assembly. Even though the rack holder may only have a single rack receiving pivot pin, the rack can have similarly constructed handle assemblies on both sides of the rack enabling the rack to be easily grasped, lifted and maneuvered.

In one preferred modular rack embodiment, the rack is constructed and arranged to receive and retain at least one pair of skis as well as its ski poles. If desired, the same rack can be further constructed and arranged to carry the ski boots and other ski-related equipment. Preferably, the modular rack has a pair of vertically spaced apart generally horizontal cross beams, each of which extends from one support post to the other support post. Each cross beam has at least one and preferably as many as four ski retainers each constructed to receive and retain a pair of skis.

In one preferred modular ski retainer embodiment, each ski retainer of the upper cross beam consists of a pair of pegs spaced apart sufficiently to receive a pair of skis between them. To positively retain skis received between the pegs, there is a fastener carried by the cross beam that at least partially encircles the skis to capture them between the pegs. One preferred fastener is a flexible and resilient strap that has one end attached to the cross beam on one side of the pair of skis and is attached to the cross beam on the other side of the skis to capture the skis between the pegs.

In another preferred fastener, the fastener is a generally rigid cap that has a pair of spaced apart through bores each for receiving a peg therethrough. To releasably capture a pair of skis received between a pair of pegs, the cap is placed over the pegs such that one of the pegs is received in one of the bores in the cap and the other of the pegs is received in the other of the bores in the cap.

To retain the cap on the pegs to positively retain skis received between the pegs, one of the pegs preferably has a bore generally transverse to its longitudinal axis for receiving a pin or cap-movement resisting detent. Preferably, one of the bores in the cap is encircled by a shoulder that has a complementary transverse bore either for receiving a retainer pin or for receiving a ball of a ball-type detent.

To accommodate a wide range of skis having different widths, such as conventional skis and wider jumping skis, the pegs can be spaced apart a sufficient distance to accommodate both types of skis. To accommodate both jumping skis and conventional skis, the longer peg has a plurality of axially spaced apart transverse retainer pin bores or detents, each for enabling the cap to be positioned at different axial locations on the peg to adjust the cap position for skis having different sizes or widths.

In one preferred ski rack embodiment, there are ski retainers carried by the bottom cross beam, each ski retainer for receiving a pair of skis therein. Each ski retainer preferably is a ski receiver that receives the end of a pair of skis by encircling the skis adjacent their ends by a cup or a generally U-shaped bracket. If a cup is used, the cup preferably has an inner diameter sufficiently large so as to be able to receive either a pair of conventional skis or a pair of jumping skis. If a cup is used, the cup preferably is attached by a fastener or the like to the bottom cross beam and lies above the rack platform.

If a U-bracket ski receiver is used, the bracket preferably consists of a rod or a wire bent in a generally U-shape and having both ends attached by fasteners to the lower cross beam. The bracket projects outwardly from the lower cross beam and overlies the rack platform to enable a pair of skis to be receivied in the bracket to positively retain them therein.

To retain smaller youth skis, the ski rack can receive a youth ski bracket that is preferably generally T-shaped having a stem that extends upwardly from adjacent the lower cross beam and a pair of arms extending outwardly from the stem and having a ski retainer adjacent the end of each arm. The youth ski retaining bracket preferably can be removably mounted to the lower cross beam such as by a fastener or the like.

In another preferred modular rack embodiment, the rack has a clamshell bicycle clamp carried either by the support posts or preferably by a horizontal cross beam. The bike clamp has an lower jaw that preferably is immovably fixed to the cross beam and an upper jaw that is pivotally attached by a pair of generally cylindrical knuckles through which the cross beam telescopically extends. Each jaw preferably has a pair of spaced apart indentions or bike receiving notches for receiving a cross bar or top tube of a bike or another suitable component of a bike or motorcycle. Preferably, there is a latch at the end of the jaws which releasably latches one jaw to the other to prevent a bike received between the jaws from freeing itself.

In a still further preferred modular rack embodiment, the rack preferably has an outwardly extending platform with a floor that can be of mesh construction for receiving and holding cargo or equipment such as lawn equipment or the like. The rack can further include a generally upstanding wall between its support posts, cross beam and truss rail for hanging cargo or equipment thereon.

Objects, features and advantages of this invention are to provide a rack system that facilitates quick and easy removal and mounting of racks on a universal rack holder; is versatile in that it utilizes a rack holder of universal construction able to receive racks of many different configurations having many different uses; can receive and retain racks for holding skis, bikes, lawn and garden equipment and more; permits a rack carried by the holder to be securely retained in a closed position while transporting equipment and cargo while being able to be moved to a position away from the closed position to permit unobstructed access to the rear of the vehicle; does not obstruct vehicle tail lights and brake lights; includes a rack having an integral handle assembly that can be easily and firmly grasped to lift and maneuver the rack; includes an article retainer having a pair of spaced apart pegs and a cap removably received on the pegs to capture and article between the pegs; includes an adjustable article retainer with pegs having detents or the like that enable the cap to be mounted on the pegs at different distances along the pegs to accommodate articles of different sizes and widths; utilizes a rack of universal construction which can be adapted to a variety of uses and functions and to carry different types of equipment and cargo; is of a construction that facilitates swinging of the rack in a low friction manner while being able to support relatively heavy equipment; and is a rack, rack holder and rack system that is rugged, simple, flexible, reliable, and durable, and which is of economical manufacture and is easy to assemble and use.

BRIEF DESCRIPTION OF THE DRAWINGS

These and other objects, features, and advantages of this invention will become apparent from the following detailed description of the best mode, appended claims, and accompanying drawings in which:

DETAILED DESCRIPTION

I. Introduction

Figure 1:
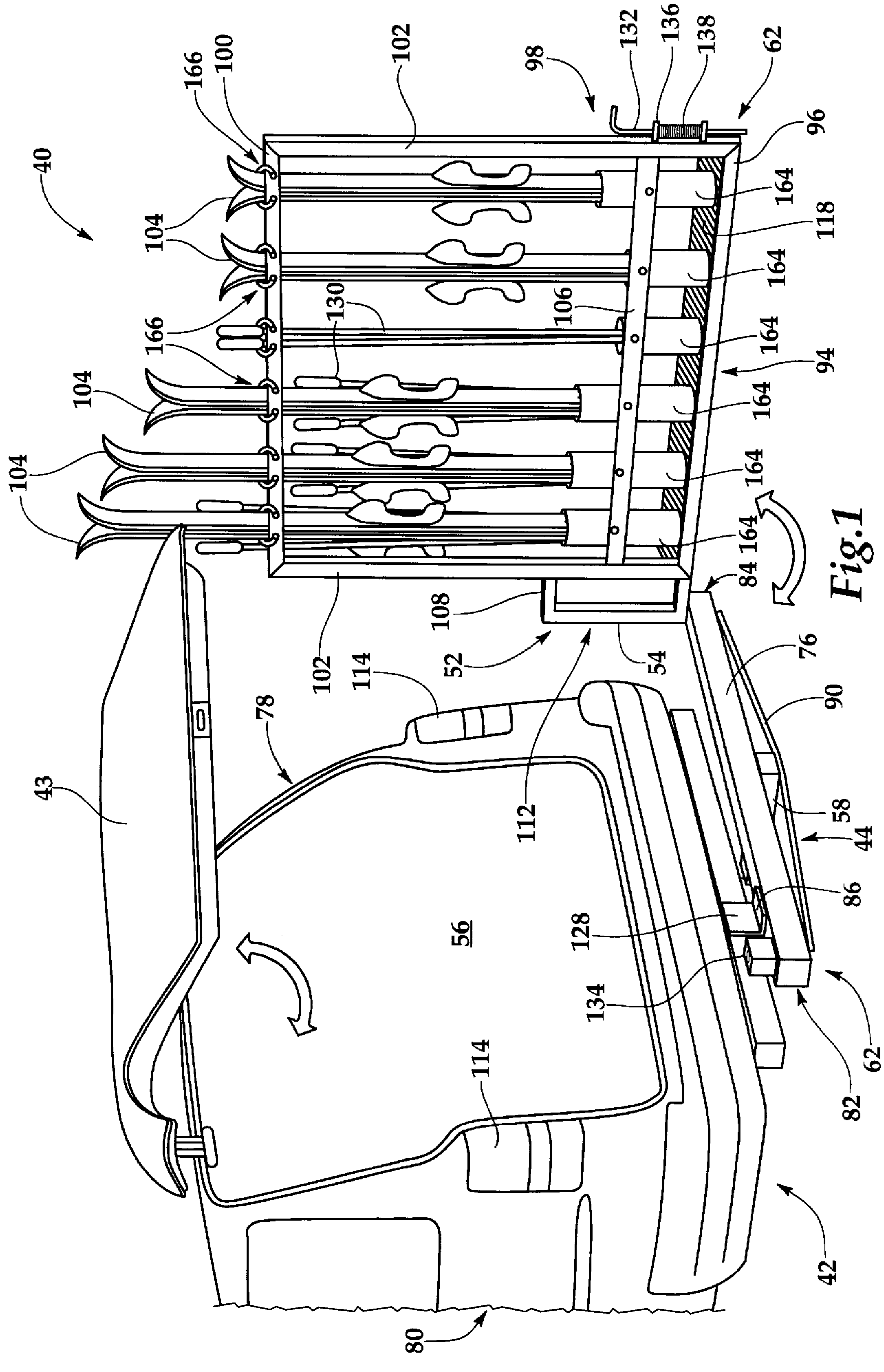
FIG. 1 illustrates a perspective view of an interchangeable modular rack system of this invention that includes a single modular ski rack carried on a rack holder constructed and arranged to permit the rack to pivot away from the rear of the vehicle for allowing the rear of the vehicle to be accessed.

FIGS. 1–3 and 18–24 illustrate a modular rack system 40 of this invention for a vehicle 42 that includes a rack holder 44 for receiving a modular rack 46 that (a) is easily swung away from the vehicle 42 in the manner shown in FIG. 1, (b) can be releasably retained in a closed position (FIG. 2), and (c) can be easily, simply and quickly be removed (FIG. 3) from the rack holder 44 to allow another rack module 46 to easily, simply and quickly be mounted on the rack holder 44. In this manner different racks 46 for different applications can be quickly, simply and easily be interchanged on a single rack holder 44 providing a modular vehicle rack system 40 of this invention that is economical, versatile and which can be adapted to new applications as they are discovered or needed.

The rack holder 44 includes an uprightly extending rack receiver 48 that preferably is a pin 50 which cooperates with a rack coupler 52 of the rack 46 that preferably is a sleeve 54 on the rack 46 to allow the rack 46 to swing toward or away from the rear 56 of the vehicle 42 while enabling the rack 46 to be easily removed from the rack holder 44 by lifting the rack 46 upwardly off the rack holder 44. The rack 46 is of modular construction having a sleeve 54 for cooperating with the rack holder pivot pin to permit quick and easy removal from the rack holder while allowing it to be swung away from the rear 56 of the vehicle 42 carrying the rack 46 and rack holder 44. In this manner, a system of modular racks constructed for different applications can be quickly and easily interchanged as needed on a single rack holder 44 carried by a vehicle 42.

II. Rack Holder

Figure 2:
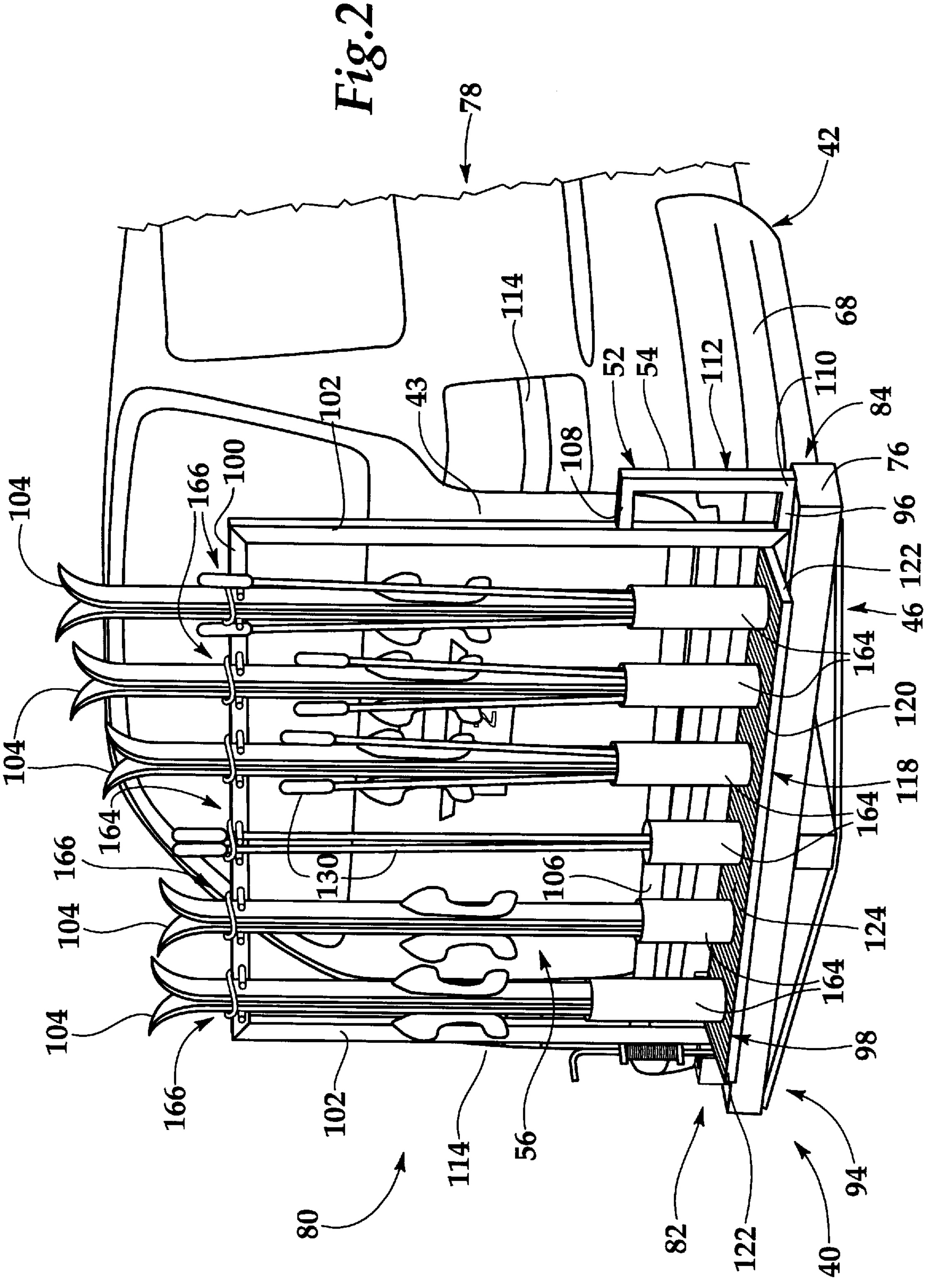
FIG. 2 depicts the ski rack of the modular rack system in the closed position.
Figure 3:
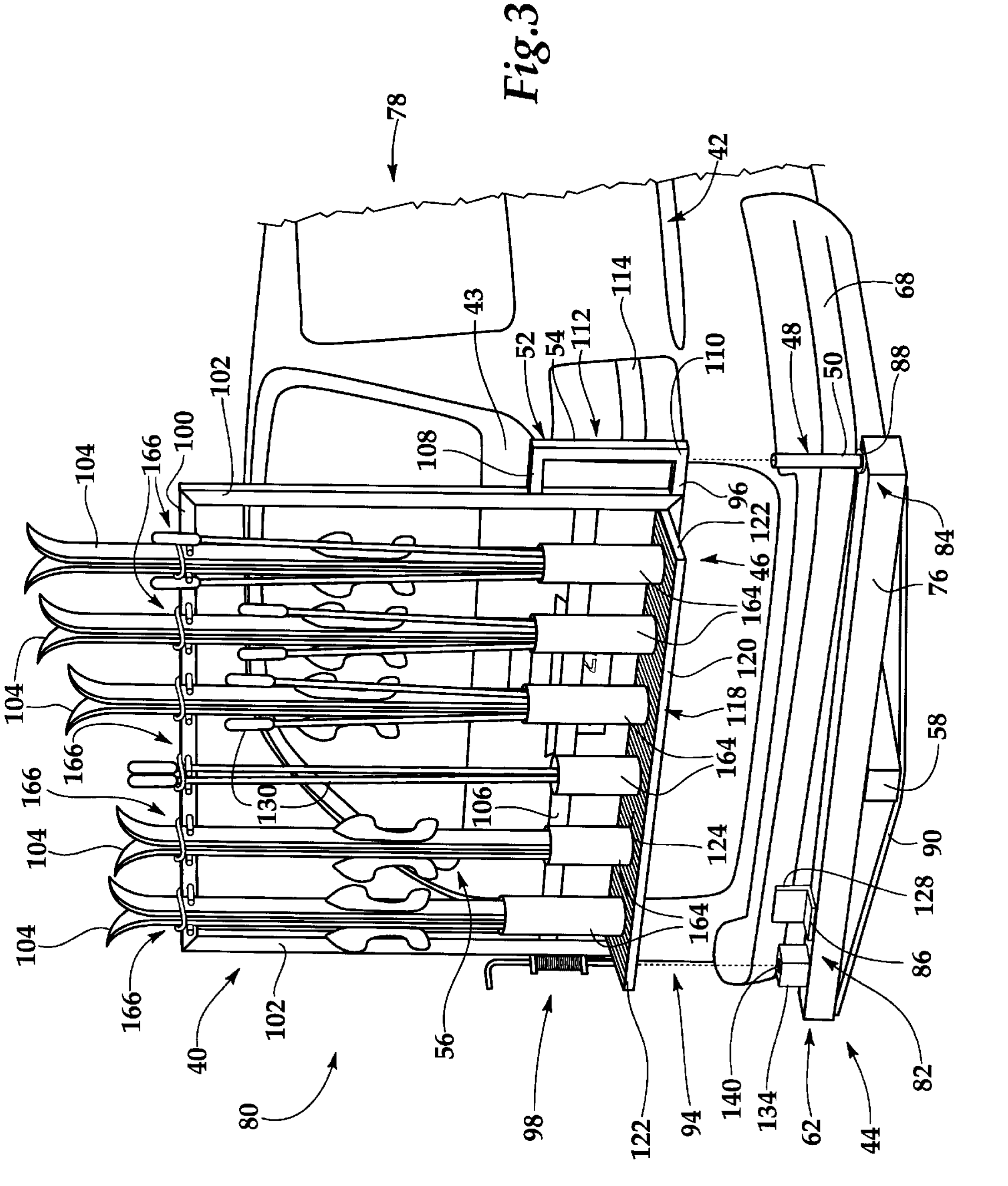
FIG. 3 illustrates removal of a modular rack from the rack holder.
Figure 4:
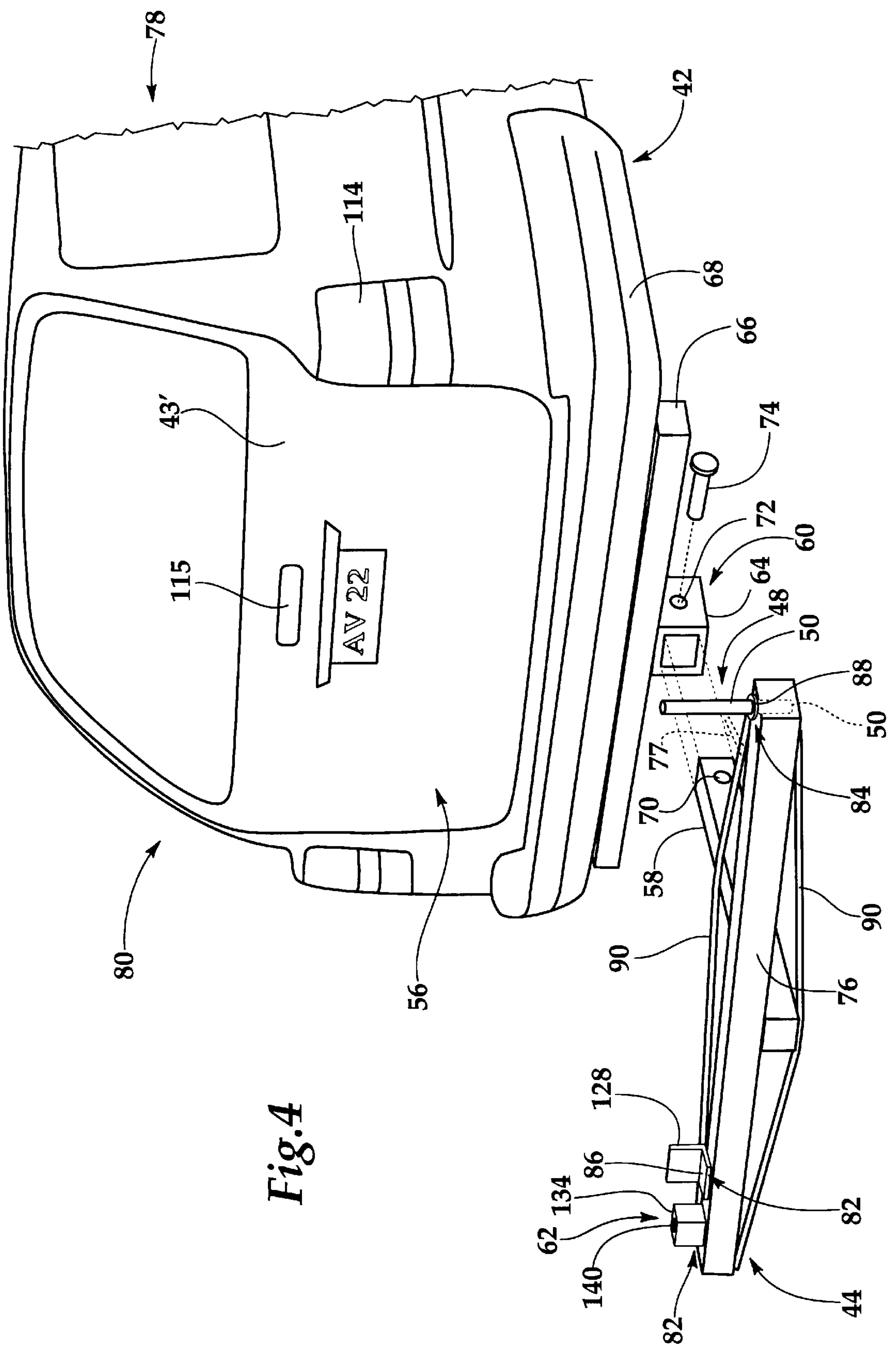
FIG. 4 illustrates a preferred construction of the rack holder and its attachment to the rear of a vehicle.

Referring to FIGS. 1–4, a first preferred embodiment of the rack holder 44 is depicted. As is shown in FIG. 4, the rack holder 44 has a tongue 58 adapted to be coupled to or engaged with a hitch connection 60 (FIG. 4) of the vehicle 42 such that at least part of the tongue 58 extends outwardly from the hitch connection 60 when coupled thereto. The rack receiver 48 is located adjacent one end of the rack holder 44 for releasably receiving and retaining a rack 46 while permitting the entire rack 46 mounted on the holder 44 to be lifted free of the holder 44 by being lifted free of the rack receiver 48. A latch assembly 62 is located adjacent the opposite end for releasably retaining a rack 46 received on the rack holder 44 in the closed position (FIG. 2). The rack receiver 48 of the holder 44 is located a distance from the tongue 58 and does not overlie the tongue 58. The latch assembly 62 preferably is located at or adjacent the end of the rack 46 opposite the rack coupler 52. Partial portions of the latch assembly are shown in FIGS. 3–5A and 11–12.

In the preferred rack holder embodiment shown in FIG. 1, the tongue 58 preferably consists of a bar, a tube, a channel, a beam, or a rod of generally square or rectangular cross section that is telescopically received by a hitch connection 60 that is a hitch receiver 64 (FIG. 4) having a complementary hollow of generally square or rectangular cross section. The hitch receiver 64 is shown in FIG. 4 attached to a generally horizontal hitch receiver support tube 66, that is in turn, secured to a portion of the frame of the vehicle 42, all of which generally underlies the rear vehicle bumper 68.

To enable the tongue 58 to be releasably coupled to the hitch receiver 64, both the tongue 58 and hitch receiver 64 have a generally horizontal through-bore 70 & 72 which are generally coaxially aligned when the tongue 58 is inserted into the hitch receiver 64. To releasably couple the tongue 58 to the hitch receiver 64, a pin 74 or another type of retainer is inserted through both bores 70 & 72.

If desired, the tongue 58 can also be constructed so it can be coupled to a conventional ball-type hitch (not shown) attached to the frame of a vehicle. A tongue 58 of this construction preferably has a complementary hollow end that fits over the hitch with the hitch prepared for receiving the tongue by first having its hitch ball removed. The tongue preferably has a generally vertical bore that generally coaxially aligns with a complementary bore in the hitch used to receive a threaded shank or stem of the hitch ball. To releasably couple a tongue of this construction, a pin or another type of retainer is inserted through both bores.

The rack holder 44 includes a transverse and generally horizontal support base 76 carried by the tongue 58 preferably adjacent the end that is opposite the tongue end coupled to the hitch receiver 64 or hitch. The rack holder base 76 preferably is an elongate beam attached between its ends to the tongue 58. The base 76 has one end extending outwardly of the tongue 58 and toward the passenger side 78 of the vehicle 42. The other end of the base 76 extends outwardly of the tongue 58 and toward the driver side 80 of the vehicle 42. Preferably, the base 76 can be constructed so as to extend substantially across the length of the rear of the vehicle 42 to accommodate racks 46 of the same length capable of carrying a substantially greater capacity or load than other known commercially available vehicle racks.

Preferably, each end of the base extends at least about twelve inches in either direction to each side of the tongue 58 and has a total length of at least about two feet to accommodate racks 46 of about the same length capable of carrying a relatively large capacity or load. In a preferred embodiment of the rack holder 44, each end of the base 76 extends at least about thirty inches in either direction on each side of the tongue 58 and has a total length of between about sixty-three and about sixty-four inches.

Preferably, the rack holder 44 is constructed and arranged such that any modular rack 46 received by the holder 44 is supported by the holder 44 at least two points or locations 82 & 84. Preferably, rack support points 82 & 84 are spaced from each other such that they are located on opposite sides of the tongue 58, such as is depicted in FIG. 3, to provide moments about the tongue 58 which oppose each other when a rack 46 received by the rack holder 44 is in the closed position. Preferably, the rack holder 44 supports a rack 46 received on the holder 44 adjacent each end of the rack holder base 76 to create opposing moments about the tongue 58 which at least partially and preferably substantially cancel each other out during operation to minimize how much torque is applied by and through the base 76 to the tongue 58.

To provide additional resistance to bending moments of the rack holder base 76 about the tongue 58, the base 76 can be constructed having a brace 77 (shown in phantom in FIG. 4) that extends from the base 76 to the frame 66 carrying the hitch connection 60. Preferably, the brace 77 can simply bear against the hitch connection frame 66. Preferably, the brace 77 can be directly attached to the frame 66 such as by welding or by a bracket, cap or sleeve of generally hollow and square or rectangular cross section that telescopically slides over the frame 66 to anchor the brace 77 and hence the rack holder base 76.

In the preferred rack holder embodiments shown in FIGS. 1–5A, the rack holder base 76 has (a) at least one latch assembly support point 82 located generally toward the driver side 80, and (b) at least one rack receiver rack support point 84 toward the passenger side 78 that is spaced at least an inch away from the tongue 58. In the preferred embodiments shown in the drawings, the rack receiver rack support point 84 is located at or near an end of the rack holder base 76. Preferably, neither rack support point 82 & 84 overlies the tongue 58 and both lie on opposite sides of the tongue 58 for providing at least some moment cancelling capabilities when a rack 46 is received on the rack holder 44.

Preferably, for the racks and rack holders shown in the drawings, the latch assembly rack support point 82 is located generally adjacent the driver side end of the rack holder base 76 and the rack receiver rack support point 84 is located generally adjacent the end of the passenger side of the base 76. In this preferred arrangement, each rack receiver rack support point 84 preferably is located at least about twelve inches away from the tongue.

As is shown most clearly in FIGS. 3–5A, the rack support point 82 located to the driver side is the latch assembly 62. The latch assembly 62 preferably includes a land portion 86 carried by the base 76 that engages and supports a rack 46 when the rack 46 is in the closed position for transferring at least a portion of the weight of the rack 46 and the contents carried by the rack 46 to the rack holder 44.

The rack receiver rack support point 84 is the rack receiver 48. The rack receiver 48 preferably is constructed and arranged to releasably receive a modular rack 46 of this invention in a manner that permits the rack 46 to pivot or swing about the rack receiver 48 while allowing the rack 46 to be easily removed from the rack holder 44 so it can be quickly interchanged with a different rack 46. Preferably, the rack receiver 48 is constructed so as to allow removal of the rack 48 by pulling the rack 46 upwardly away from the rack holder base 76 in the manner shown in FIG. 4. Preferably, the rack receiver 48 is also constructed so as to receive a rack 46 by maneuvering the rack 46 over the rack holder base 76 and rack receiver 48 and thereafter lowering the rack 46 until its rack coupler 52 engages the rack receiver 48.

The rack receiver 48 preferably is the generally upstanding or generally vertical pin or rod 50 shown in FIGS. 3–5A that extends upwardly from the rack holder base 76. As is shown in more detail in FIGS. 4, 5A & 5B, the pin 50 preferably extends downwardly into the rack holder base 76 to anchor it to the base 76. Preferably, the pin 50 is received in a bore (not shown) in the base 76. Preferably, the pin 50 is attached by a weld 242 to the rack holder base 76 adjacent the top surface of the base 76 and by a weld 244 adjacent the bottom surface to securely anchor the pin 50 to the base 76.

At the bottom of the rack receiving pin 50 there is a bearing washer 88 against which the rack 46 bears when the rack coupler 52 of the rack 46 is received on the pin 50. The bearing washer 88 supports the rack 46 and transfers at least a portion of the weight of the rack 46 and the contents carried by the rack 46 to the rack holder 44, whether the rack 46 is in an open or closed position. The bearing washer 88 preferably is a substantially flat, generally smooth annular washer 88 that at least partially encircles the pin 50 at or adjacent its base for providing bearing support to the rack 46 mounted on the rack holder 44 thereby helping to enable the rack 46 to freely swing or pivot about a vertical longitudinal axis of the pin 50. With the bearing washer 88 in place, the pivot pin 50 extends upwardly from the rack holder base 76 and washer 88 at least about ten inches and preferably no greater than about twenty five inches. Preferably, the pin 50 extends upwardly above the base 76 about eighteen inches.

In a preferred bearing washer embodiment 88, the washer is constructed of iron, steel, aluminum or another metal and has a metallic bearing surface which pivotally supports the sleeve 54 of the rack 46. If desired, the bearing washer 88 can have an overlay or coating of a friction reducing material, such as teflon, nylon, a plastic, another elastomeric material, a ceramic, brass, or another suitable friction reducing material. If desired, a lubricant, such as an oil, graphite, teflon, molybdenum or another lubricant can be applied to the bearing washer 88 to minimize friction between the rack 46 and the washer 88. Instead of being constructed of a metal, the bearing washer 88 can be constructed of teflon, nylon, a plastic, a copolyester, another elastomeric material, a ceramic, brass, or another suitable material having good friction and load bearing characteristics.

The rack receiving pin 50 is preferably of generally round cross section. If desired, the rack receiving pin 50 can be a bar, rod, channel, or tube of generally square or rectangular cross section or another cross sectional shape adapted to be received in a portion of the rack 46 or otherwise releasably coupled to the rack 46. Preferably, the pin 50 is constructed so as to be received in a hollow generally sleeve-like portion 54 of the rack 46. The rack receiving pin 50 can be of hollow or solid construction. In a preferred pin embodiment, the pin is at least one-quarter inch in diameter and preferably is a pin 50 of one inch outer diameter solid cold or hot rolled steel stock. In use, the rack receiving pin 50 also functions as a pivot pin 50 from which the rack 46 is cantilevered when swung away from the closed position.

The pin 50 extends upwardly from the rack holder base 76 and washer 88 at least about two inches for receiving the rack 46, allowing the rack 46 to pivot or swing about the longitudinal axis of the pin 50 while supporting and keeping the rack 46 in a generally upright position. In addition to providing a pivot axis about which the rack 46 can swing, the pin 50 extends far enough upwardly into the rack to resist the rack from bending, tipping or inclining forwardly or rearwardly relative to the rear 56 of the vehicle 42. As a result of this rack holder construction, (a) the rack 46 can be easily mounted to the rack holder 44 by slipping the sleeve 54 of the rack 46 over the pivot pin 50 and urging the rack 46 to its closed position, (b) the rack 46 can be swung to a position away from the closed position that is away from the rear 56 of the vehicle 42, (c) it enables the rack 46 to support relatively heavy loads even while the rack 46 is in an open position, and (d) it facilitates quick and easy removal of the rack 46 from the holder 44. In fact, when swung to a position away from the closed position, the rack 46 is only supported by the pin 50 and bearing washer 88 such that it is cantilevered from the rack holder base 76 by the pin 50. Preferably, the rack receiving pivot pin 50 is between about ten and twenty inches in length and is of generally circular cross section to enable it to provide support to the sleeve 54 of the rack 46 substantially along the entire axial length of the pin 50.

The rack holder 44 preferably is constructed by affixing the tongue 58 to the base 76, such as by welding or an adhesive process or another type of joining process. If desired, the tongue 58 and rack holder base 76 can be of one piece unitary construction manufactured such as by forging or by another suitable process which produces a tongue 58 and base 76 of unitary construction.

Preferably, at least some and preferably substantially all of the components of the rack holder 44 are constructed of a metal, such as iron, steel, a steel alloy, aluminum, an aluminum alloy or another suitable metal. If desired, the entire rack holder 44 or one or more components of the rack holder 44 can be constructed of plastic, a polymeric material or another non-metallic substance. For example, the base 76 and tongue 58 can be constructed of hollow plastic tube of square or round cross section, such as polyvinyl chloride pipe (PVC pipe).

For the rack holder 44 shown in FIGS. 1–4, to resist any unbalanced bending moment condition about the tongue 58, the holder 44 has at least one torsion resisting bar 90 that is connected to the rack holder base 76 at each end of the base and which is also connected to the tongue 58. Preferably, as is shown more clearly in FIG. 4, the rack holder 44 can be constructed with a pair of torsion resisting bars 90. As is shown in FIG. 4, the rack holder 44 can be constructed having a first torsion resisting bar 90 that attaches at each end to the base 76 generally near each end of the base 76 and which also overlies and attaches to the tongue 58. A second torsion resisting bar 90 has each of its ends similarly attached to the base 76 and is also attached to the underside of the tongue 58. During operation, the portion of each torsion resisting bar 90 that extends from the tongue 58 toward the end of the base 76 either acts in tension or compression to resist bending moments about the tongue 58 created by an unbalanced loading condition, such as unbalanced cargo, a bump or a jolt, a gust of wind or the like.

Figure 5A:
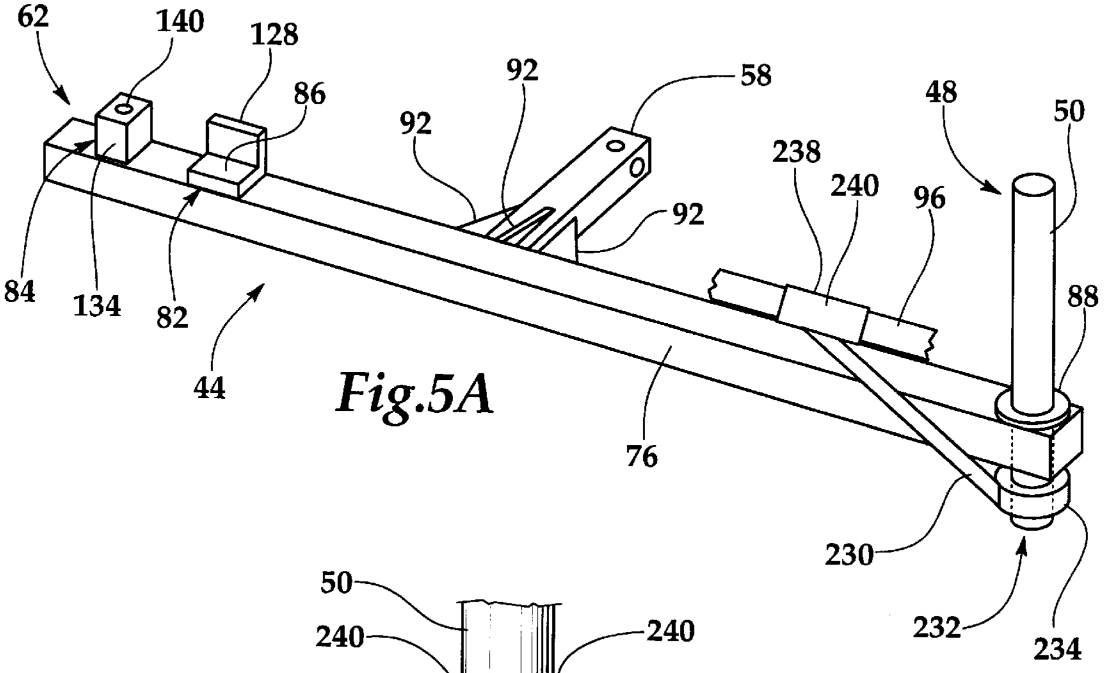
FIG. 5A shows a second preferred construction of the rack holder.
Figure 5B:
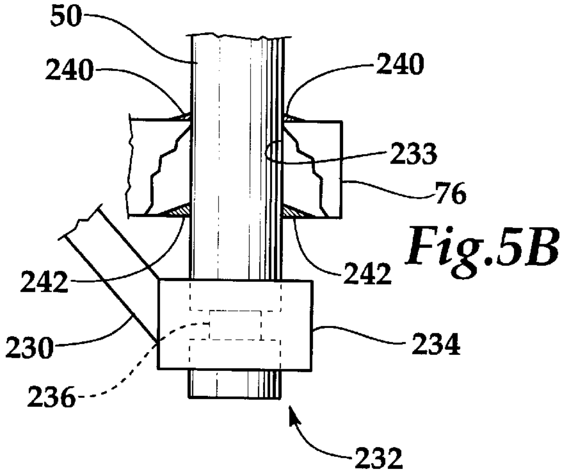
FIG. 5B is an enlarged fragmentary view of the pivot pin cutaway to show details of the attachment of the pin to the rack holder base and a swiveling rack support arm carried by the pin.
Figure 6A:
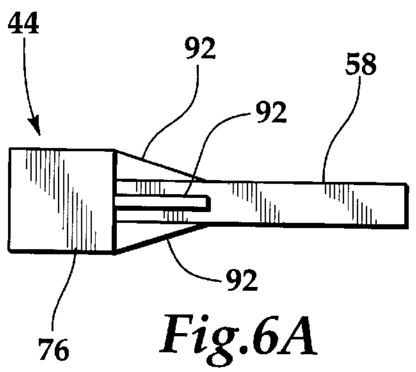
FIG. 6A illustrates a fragmentary side view of a portion of the tongue and a support beam of the rack holder.
Figure 6B:
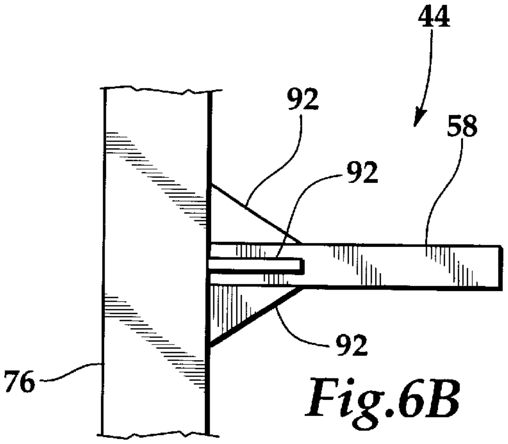
FIG. 6B illustrates a fragmentary top view of a portion of the tongue and support beam.

In another preferred rack holder embodiment shown in FIGS. 5–6B, there are no torsion resisting bars. To resist torsion about the tongue in any direction, the rack holder has at least one and preferably about three angle iron braces 92 which reinforce the attachment between the tongue 58 and base 76 and which also resist bending moments of the base 76 about the tongue 58. If desired, a combination of torsion resisting bars 90 and braces 92 can be used to resist bending moments about the tongue 58 and further strengthen the attachment between the tongue 58 and rack holder base 76.

In a preferred rack holder 44 embodiment shown in FIGS. 5A & 5B, the rack holder 44 can be equipped with a rack support arm 230 that has one end attached the pivot pin 50 and the other end attached to the swing arm support rail 96 at a location spaced from the pivot pin 50 to help support the weight of the rack 46 and its contents when the rack 46 is swung away from the closed position and cantilevered from the pin 50. In the preferred embodiment shown in FIGS. 5A & 5B, a portion 231 of the pin 50 extends completely through the rack holder base 76 and provides a mount 232 for pivotally receiving a collar 234 of the support arm 230. Preferably, the end portion 231 of the pin 50 is received and extends through a bore 233 in the rack holder base 76. Referring more particularly to FIG. 5B, the pin 50 has a groove 236 that receives a complementary radially inwardly extending shoulder (not shown) of the support arm collar 234 so that the support arm 230 can help support at least some of the weight of the rack 46 while permitting the arm 230 to pivot about the pin 50 in unison with the rack 46. To secure the other end of the support arm 230 to the support rail 96 of the rack 46, the rack support arm 230 has a bracket 238 that receives the rail 96 and preferably which can be secured to the rail 96 by a retainer 240.

III. Modular Rack Construction

The modular rack 46 shown in FIGS. 1–3 comprises a swing arm truss structure 94 having a rack coupler 52 at or adjacent one end of the swing arm truss 94 for coupling with the rack receiver of the rack holder. The swing arm truss 94 includes a support rail 96 at its bottom and a load carrier 98 carried by the rail 96 that is specially adapted to carry a particular type of equipment, a combination of kinds of equipment, or a load that is not made up of any equipment. The rack coupler 52 is spaced from the tongue 58 so as not to overlie the tongue 58. The rack coupler 52 preferably is a generally vertical hollow sleeve 54 that is located at or adjacent one end of the swing arm rail 96 for telescopingly receiving the rack receiving pivot pin 50 of the rack holder 44.

At or adjacent the other end of the swing arm rail 96 preferably is a portion of the latch assembly 62 for releasably retaining the rack in the closed position. For the latch assembly 62' shown in FIGS. 7A & 7B, the portion of the latch assembly 62' at or adjacent the other end of the swing arm rail 96 preferably is the swing arm rail 96 itself.

A. Single Swinging Rack Construction

The modular rack 46 shown in FIGS. 1–3 is of single arm construction having a rack 46 that consists of a single swing arm truss 94 that is pivotally carried by a rack holder 44 when mounted on a rack holder. The swing arm truss 94 includes a generally horizontal truss support rail 96 at the bottom (FIG. 1) and a generally upstanding load carrying frame 98 carried by the support rail 96. Preferably, the load support frame 98 includes at least one horizontal cross beam 100 for helping to support, stabilize or carry cargo. The support frame 98 shown in FIGS. 1–3 preferably includes a pair of vertical and spaced apart posts 102 which are carried by the swing arm rail 96 at their bottom and which are joined together by at least one generally horizontal cross beam 100 that is spaced upwardly from the bottom end of both posts 102.

In the preferred rack embodiment shown in FIGS. 1–3 constructed for carrying skis 104, there is an upper horizontal cross beam 100 connecting the posts together at or adjacent their top ends. Another generally horizontal lower cross beam 106 joins the posts 102 together between the upper cross beam 100 and the swing arm support rail 96 and is spaced upwardly from the rail 96. Both the upper and lower cross beams 100 & 106 preferably can be constructed and arranged to receive or support equipment of some kind.

While each of the cross beams 100 & 106 and support posts 102 are preferably constructed of a tubular material, such as tubular steel, iron or aluminum, they can also be constructed of solid rod, channel, angle iron, a plastic, a polymer or an elastomer such as PVC pipe. In the rack embodiment shown in FIGS. 1–3, the joint between the upper cross beam 100 and each post 102 forms a square corner and can be produced by adhesively joining the beam 100 to each of the posts 102. The adhesive process can be welding, brazing, an epoxy adhesive, another adhesive, or another type of joining process.

If desired, the beam 100 and posts 102 can be constructed of a single tubular or solid component bent to form the corners shown in FIGS. 1–3. If formed of a single tubular component, a rack 46 can be constructed with the connection region between the upper cross beam 100 and posts 102 being rounded, such as is exemplified by the rack of FIG. 17A.

The rack coupling sleeve 54 is depicted in FIGS. 1–3 as being located at one end of the truss. The sleeve comprises a hollow beam, channel or tube of generally square, rectangular, or circular cross section for being able to telescopically receive the rack receiving pivot pin 50 of the rack holder 44. The sleeve 54 preferably is spaced from the nearest support post 102 and is connected adjacent its bottom to the swing arm rail 96 and is connected adjacent its top by a strut 108 to a post 102. In the rack shown in FIG. 1, the sleeve 54 is spaced outwardly from the nearest support post 102.

In a preferred rack embodiment shown in FIGS. 2 & 3, the bottom end 110 of the sleeve 54 extends downwardly beyond the support rail 96 of the swing arm truss 94 to space the swing arm rail 96 at least slightly above the rack holder base 76 to avoid scraping the truss rail 96, or another other component of the truss 94 above the rail 96, against the rack holder 44 so that the rack 46 is capable of freely swinging toward or away from the rear 56 of the vehicle 42. Preferably, the axial end at the bottom of the sleeve 54 bears against the bearing washer 88 to facilitate the swinging action of the rack 46 on the rack holder 44. Although the bottom end 110 of the sleeve 54 can extend downwardly below the swing arm support rail 96, the thickness of the bearing washer 88 can be increased or a sufficiently thick spacer can be placed between the washer 88 and the rack holder base 76 so that the bottom end of the sleeve 54 can be constructed substantially flush with the bottom surface of the swing arm support rail 96 of the rack 46.

The sleeve assembly preferably also forms a novel handle 112 that can easily be grasped to maneuver the rack 46, such as for pulling the rack 46 upwardly free of the rack holder 44 or putting a rack 46 on a holder 44. If desired, the rack 46 can be constructed having a handle assembly 112 on both sides of the rack 46 to facilitate quick and easy changing racks 46. Additionally, by constructing a rack 46 with a handle assembly 112 on both sides of the rack 46 (FIGS. 17A, 21 & 23), a more robust and stronger rack 46 can be constructed for carrying relatively heavy loads in excess of about one hundred and fifty pounds because the handle assemblies 112 enable the rack 46 to be lifted onto or free of the rack holder 44 by two men with one man grasping one handle assembly 112 and the other man grasping the other handle assembly 112.

Preferably, the vertical support posts 102 of the rack 46 lie inboard of the tail lights 114 of the vehicle 42 so that the rack 46 will not obstruct viewing of the tail lights 114 from behind. Preferably, each handle assembly 112 is constructed so as not to completely or even substantially obstruct any tail light 114 of a vehicle 42 carrying the rack 46. Preferably, each handle assembly is constructed and located so as not to obstruct any tail light 114.

To ensure that no tail lights 114 are completely obstructed, the diameter or width of each strut and sleeve are narrower than the width of the tail light 114 of the vehicle 42 carrying the rack 46. Preferably, the width or diameter of the sleeve 54 is no greater than about the outer diameter of the pin 50 and for a pin 50 of one inch outer diameter the inner diameter is at least about one inch creating a relatively snug to loose fit that permits the sleeve 54 to swing about the pivot 50. Preferably, the sleeve 54 and strut 108 are constructed of round hollow steel tube having an inner diameter of about one inch.

Figure 25:
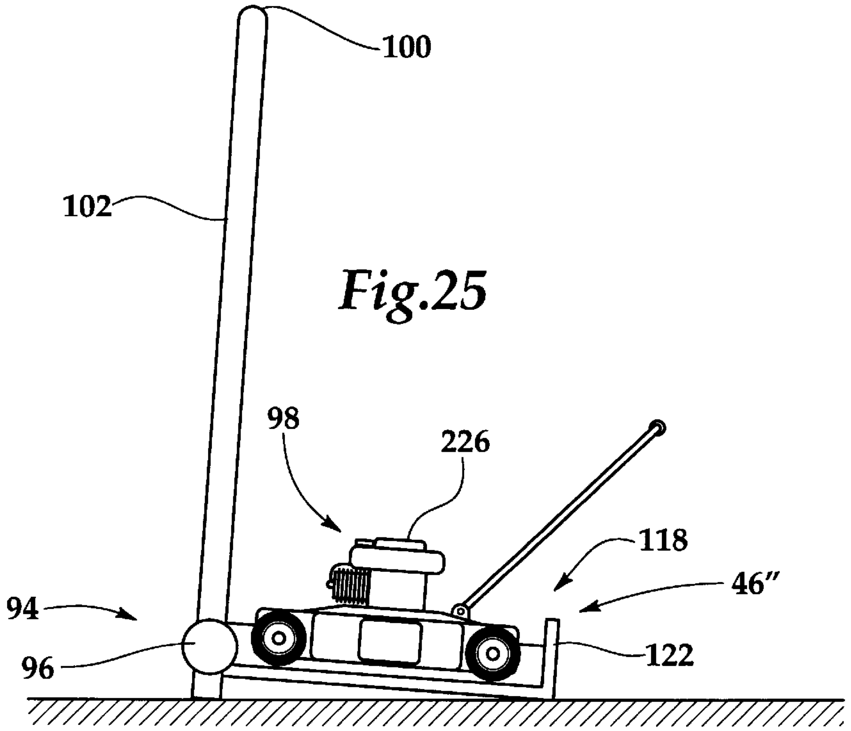
FIG. 25 illustrates the general purpose rack removed from the rack holder and supported by its platform on the ground while carrying cargo.

At the bottom of each rack 42 there preferably is a platform 118. The platform 118 preferably is constructed and arranged to protect equipment or other cargo carried by the rack 46. The platform 118 can also be constructed to carry or directly support equipment or cargo carried by the rack 46, such as is shown in FIG. 25. Preferably, the platform 118 is located between any equipment or cargo carried by a rack 46 and the underlying ground or roadway.

Figure 24:
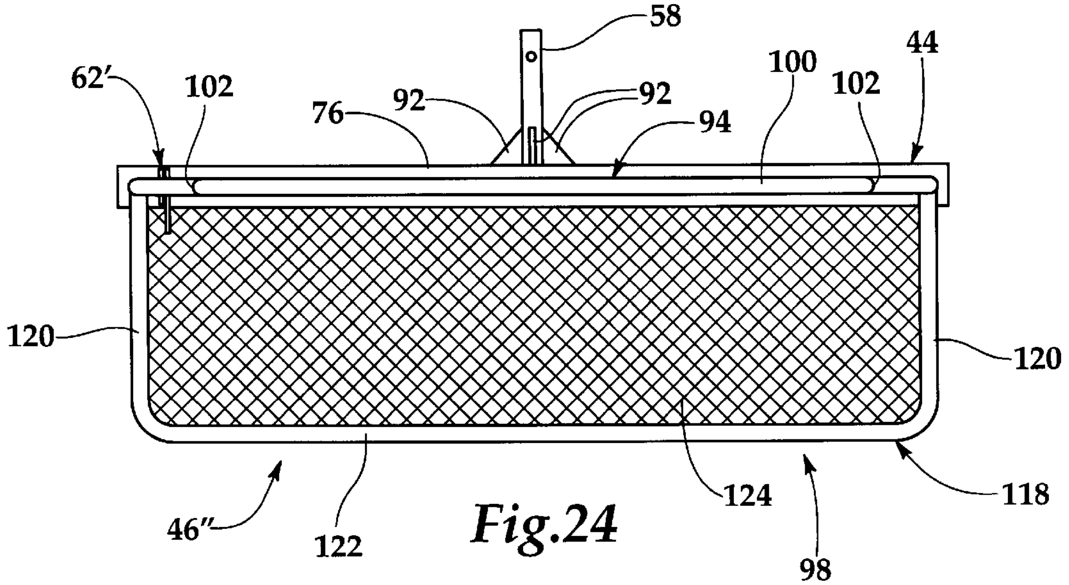
FIG. 24 is a top view of the general purpose modular rack illustrating in more detail a cargo support platform carried by the rack.

Referring to FIG. 24, the platform 118 includes a pair of spaced apart legs 120 which extend outwardly from the swing arm truss 94. The end of both legs preferably are connected by a front rail 122. Preferably, the platform 118 includes a floor 124 that can be constructed of a generally rigid meshlike material such as a metal mesh, wire, or the like which is received in the space between the swing arm rail 96, the platform legs 120 and the platform front rail 122. If desired, the floor 124 of the platform can be constructed of a solid sheet, such as if it is desirous to prevent objects from falling through the platform 118 or debris from travelling upwardly through the platform floor 124. In this manner, the platform floor 124, whether constructed of mesh or solid material, protects the cargo carried by the rack 46 while preventing it from coming into contact with the ground.

Figure 26:
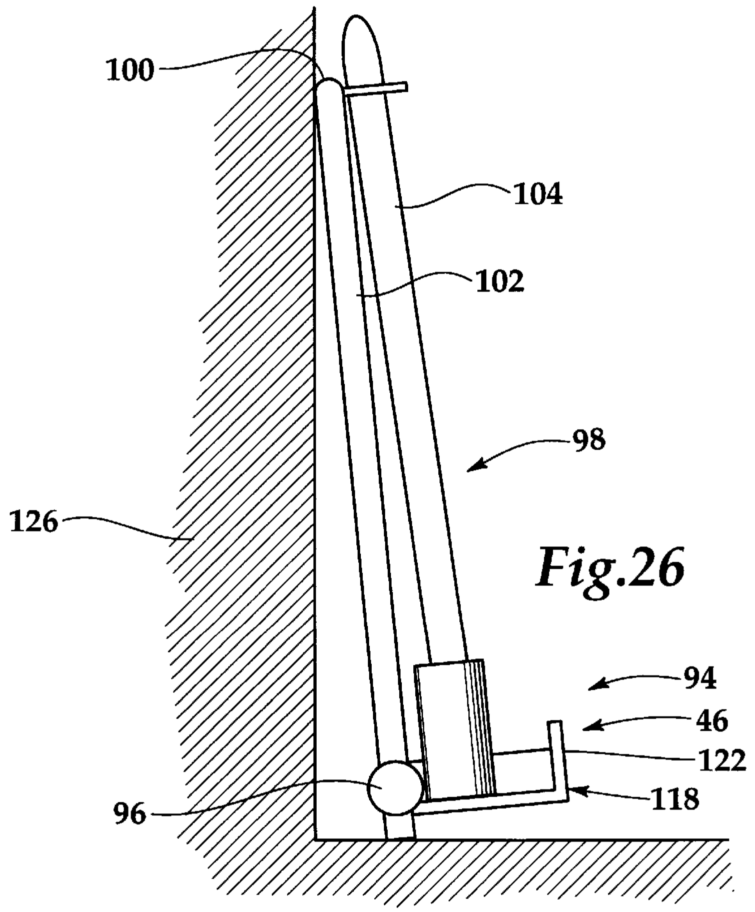
FIG. 26 is a side view of a loaded ski rack stored tipped uprightly against a wall.

Referring to FIGS. 25 & 26, the platform 118 preferably extends outwardly from the swing arm support rail 96 at least about two inches so that the rack 46 can be taken off of the rack holder 44 and set uprightly on the ground without the rack 46 tipping over. By virtue of this novel feature, equipment or cargo need not be unloaded from the rack 46 before or when the rack 46 is removed from the rack holder 44.

For example, if the rack 46 is a ski rack 46, the rack 46 can be removed from the rack holder 44 and set uprightly on the ground such that it stands without assistance. Advantageously, the skis 104 need not be removed before or when the rack 46 is removed from the rack holder 44 and the skis 104 can remain on the rack 46 for storage until needed. In this manner, the rack 46 of this construction also advantageously facilitates space saving storage of the equipment (skis) it is designed to carry because the equipment (skis) can be left on the rack 46 after the rack 46 has been removed from the rack holder 44. Thereafter, the already loaded rack 46 can simply be placed on the rack holder 44 for transport by the vehicle to the intended destination, such as the ski slope for example. As a result, the construction of this novel modular rack 46 enables the cargo or equipment (skis) to be stored on the rack 46 until needed, such as in the manner shown in FIG. 26, and thereafter quickly and easily loaded onto the rack holder 44 saving time because the cargo or equipment does not need to be unloaded from the rack 46 each time the rack 46 is removed and loaded on the rack 46 again each time the rack 46 is mounted on the rack holder 44.

Similarly, if the rack 46 is a rack for carrying sheet and/or automotive glass (not shown), the glass rack can be removed from the rack holder without first having to remove the glass from the rack. In this manner, glass for different applications can be loaded on different racks and the rack carrying the glass for the desired application can simply be loaded onto the rack holder when needed. The flexibility and ease of use of the modular rack system of this invention will likely give rise to many other rack applications allowing racks for different or similar applications to be quickly changed while allowing the racks to be used to store the cargo or equipment when not needed or not in use.

Another advantage to a rack 46 of the rack system 40 of this invention that is equipped with a platform 118 is that a loaded or unloaded rack 46 can be stored in a garage by standing it uprightly or leaning it against a wall 126 or the like, such as the garage side wall 126 shown in FIG. 26. If the bottom end of one or both posts 96, handle assemblies 112, or sleeves 54 extend below the bottom surface of the swing arm truss support rail 96, they preferably function as legs about which the rack 46 can be tipped and which support the rack 46 when leaned against a wall 126 or other vertical surface. If no such legs are found on the rack 46, the rack preferably can be tipped about the swing arm truss support rail 96.

Even if legs extend below the swing arm truss support rail 96, the mass and outwardly extending length of a rack 46 equipped with a platform 118 preferably enables the platform 118 to "anchor" the rack 46 such that it can stand upright, albeit tipped slightly forwardly, by being supported by the platform 118. When loaded on the rack 46, the center of gravity of the load, cargo or equipment preferably overlies at least a portion of the platform 118 to further cause the rack 46 to tip forwardly more stably supporting the rack 46 uprightly on the ground on the platform 118.

B. Dual Swinging Rack Construction

Referring to FIGS. 11–16, a rack system 40' having pair of racks 46*a* & 46*b* carried on a single rack holder 44' with the racks 46*a* & 46*b* being of dual swing arm construction is disclosed. Each modular rack 46*a* & 46*b* of the dual swing arm rack system 40' is of essentially the same construction as the single swing arm type except that each rack of the dual swing arm type is approximately half the length of the single swing arm rack so that a pair of racks 46*a* & 46*b* can be carried on a rack holder 44' having a pair of rack carrying pivot pins 50. To latch each rack 46*a* & 46*b*, there is a latch assembly 62 carried by the rack holder 44' for each rack 46*a* & 46*b*.

Figure 12:
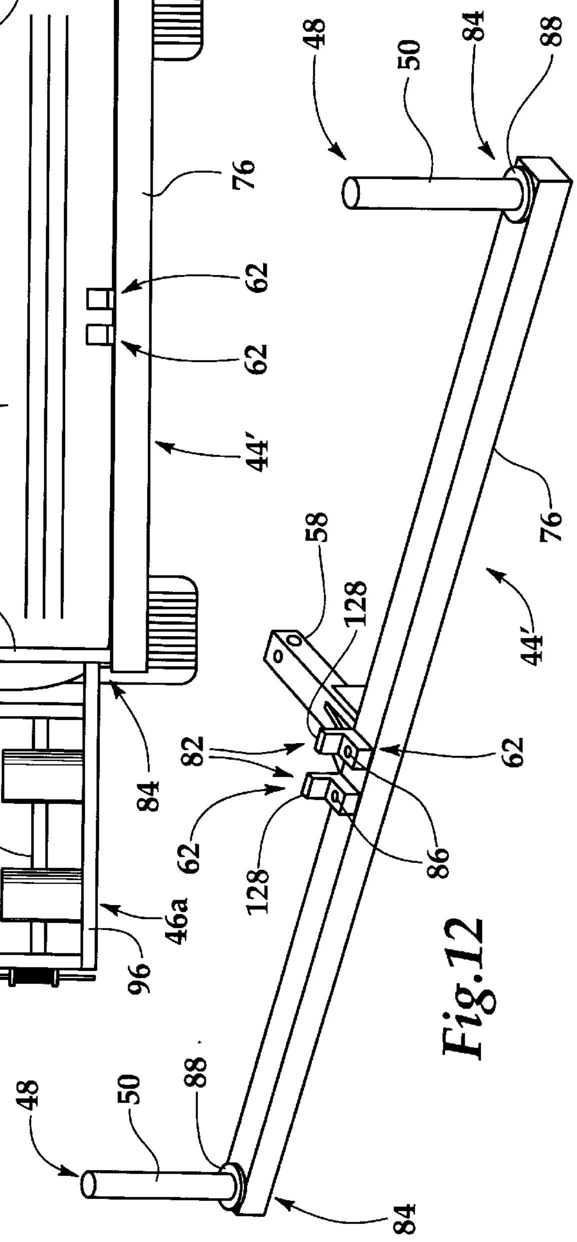
FIG. 12 shows the rack holder of the dual swinging modular rack system.
Figures 13, 14, 15:
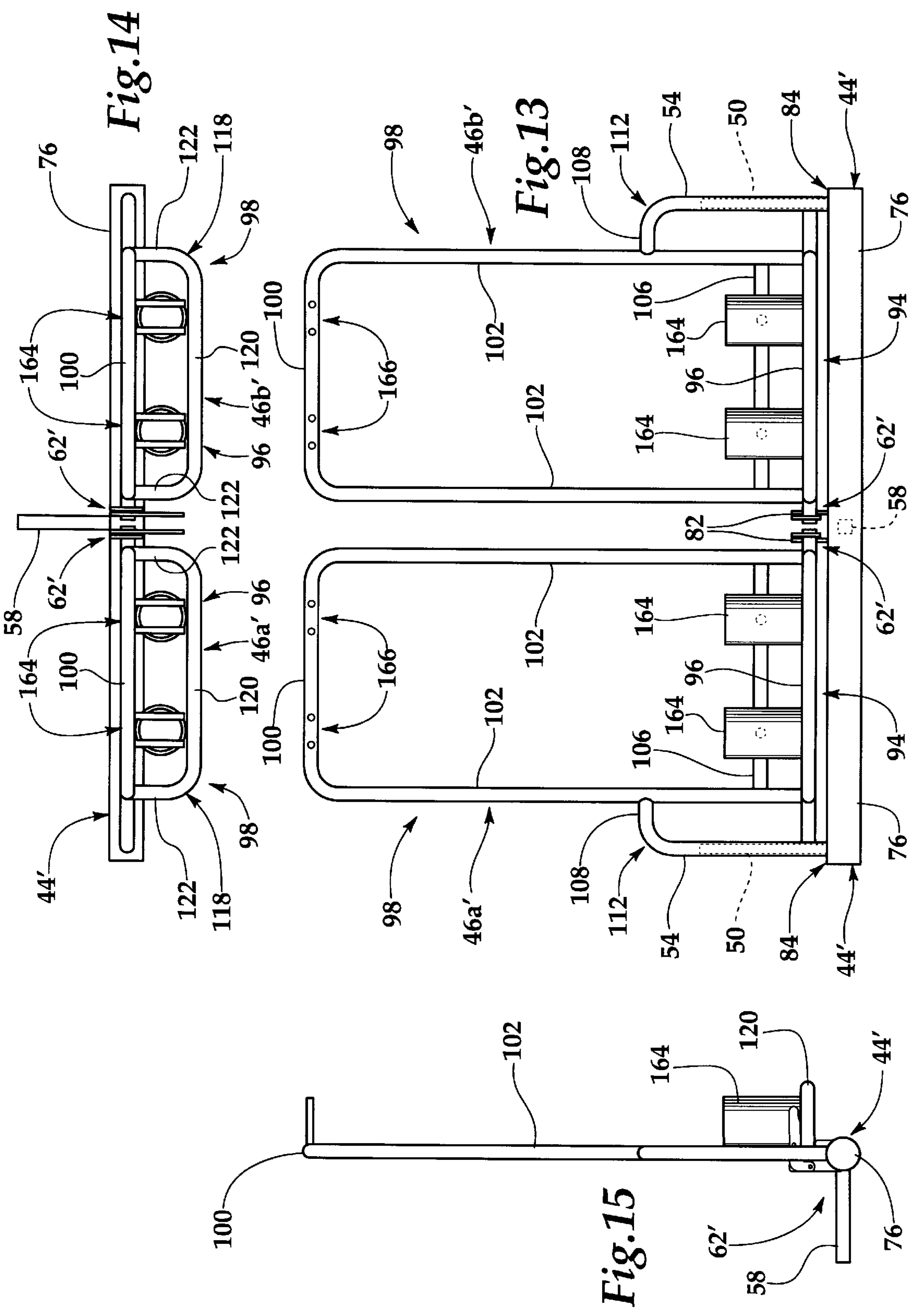
FIG. 13 depicts in more detail the dual swinging modular rack system.
FIG. 14 is a top view of the dual swinging modular rack system.
FIG. 15 is a side view of the dual swinging modular rack system.

As is shown in FIG. 12, the rack holder 44' preferably has a rack receiving pin 50 adjacent the passenger side of the rack holder 44' and a rack receiving pin 50 adjacent the driver side of the rack holder 44', each pin 50 for receiving and pivotably supporting a rack thereon. At the base of each pin 50 preferably is an annular bearing washer 88, although the rack 46*a* & 46*b* can be constructed without such a bearing washer 88 encircling each pin 50. Each pin 50 is located adjacent each end of the rack holder base 76 so that when a pair of racks 46*a* & 46*b* mounted on the rack holder 44' are unlatched, they swing outwardly away from the rear of the vehicle 42 to permit substantially completely unobstructed access to the rear 56 of the vehicle 42. Adjacent the tongue 58 are a pair of latch assemblies 62 each of which cooperate with a rack 46*a* & 46*b* for enabling each rack 46*a* & 46*b* to be releasably latched in the closed position. Each latch assembly 62 preferably includes a land 86 which functions as a support point for supporting one end of a rack 46*a* & 46*b* when the rack is in the closed position. Each latch assembly 62 also preferably includes a stop 128 for preventing a rack from swinging inwardly toward the vehicle 42 beyond the closed position.

Figure 11:
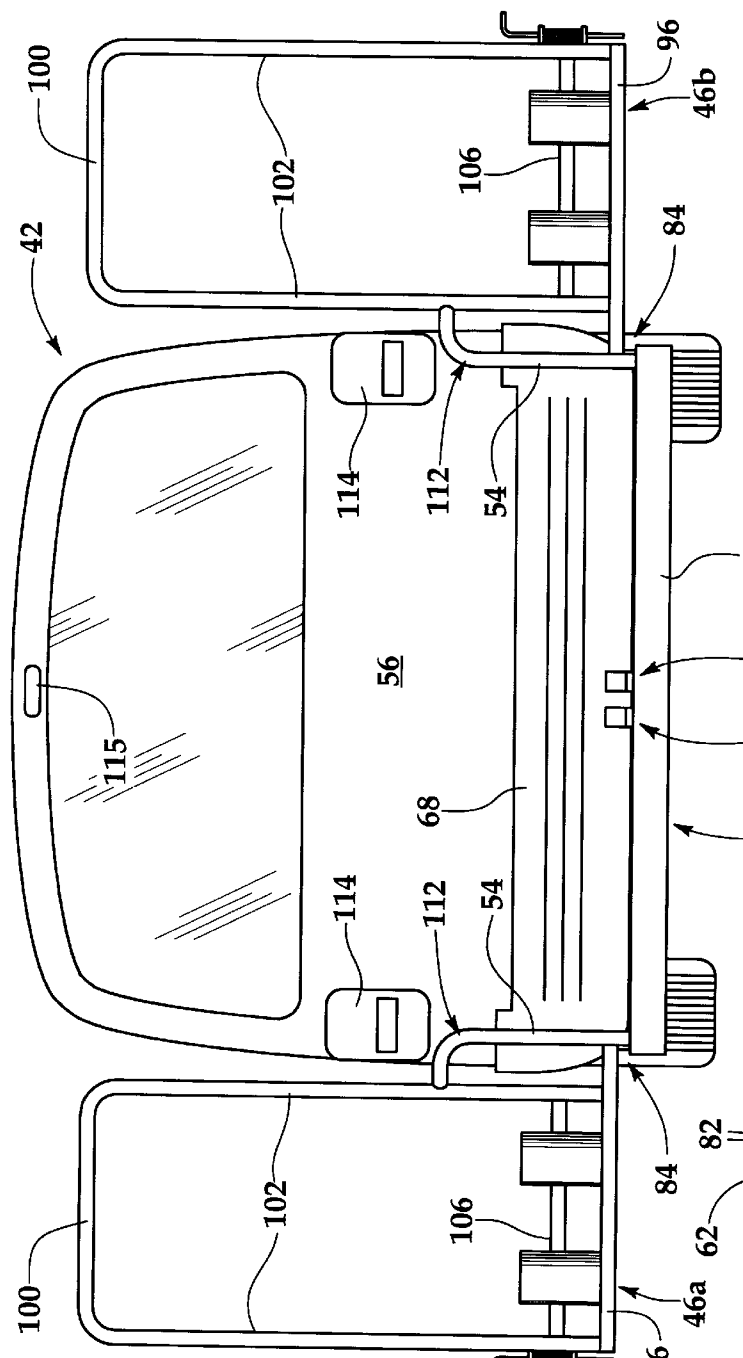
FIG. 11 illustrates a dual swinging modular rack system of this invention.

Referring to FIG. 11, each rack 46*a* & 46*b* has a sleeve 54 located adjacent one end of the swing arm truss 94 that is connected by a strut 108 to a vertically upstanding post 102 of the rack. Each pair of racks 46*a* & 46*b* are constructed such that the sleeve 54 for one of the racks is located adjacent the driver side and the sleeve 54 for the other of the racks is located adjacent the passenger side to ensure that the rear 56 of the vehicle 42 is unobstructed when the racks 46*a* & 46*b* are unlatched and swung outwardly away from the rear 56 of the vehicle 42. For the dual swing arm modular rack system 40' shown in FIG. 16, the sleeve 54 of the driver side rack 46*a* is located toward the driver side and the sleeve 54 of the passenger side rack 46*b* is located toward the passenger side.

Each sleeve 54, swing arm truss 94, and connecting strut 108 of each rack 46*a* & 46*b* preferably cooperate to form a handle 112 that can easily be grasped to manipulate the rack so it can be easily removed from the rack holder 44' or mounted on the rack holder 44'. In grasping a rack 46*a* or 46*b* to maneuver it, the handle assembly 112 and the opposite post 102 of the rack can be grasped to lift, lower or otherwise maneuver the rack.

The dual swing arm racks 46*a* & 46*b* shown in FIGS. 11–16 are designed to hold at least one pair of skis 104 per rack and preferably can hold as many as two pairs of skis 104 per rack, along with the poles 130 for each pair of skis 104. Swing arm racks can also be constructed to hold bicycles, motorcycles, wood, granular material, lawn equipment, snow removal equipment, all-terrain vehicles, snowmobiles, plate and automotive glass, and other equipment and material.

IV. Latch Assembly

FIGS. 1, 3–5A, 7A, 7B, and 19 show various details of two preferred latch assembly embodiments. In one of the preferred latch assembly embodiments, the latch 62 includes a pin 132 on either the rack holder 44 or the swing arm truss 94 that can be received by a pedestal 134 on the other of the rack holder 44 or the truss 94 to releasably secure and retain the rack 46 in the closed position. Preferably, the latch pin 132 is carried by the rack 46 and the pedestal 134 is carried by the rack holder 44.

In FIGS. 1 and 3–SA, the latch pin 132 is carried by a bracket 136 attached to the driver side post 102. The latch pin 132 is biased toward a latching position by a spring 138 captured between a pair of spaced apart arms of the latch bracket 136. The latch pedestal 134 preferably is carried by the rack holder base 76 and has an aperture 140 (FIG. 4) in its top surface for receiving the 134 can be of sufficient height to engage or bear against the swing arm truss rail 96 to provide a support point between the rack holder 44 and rack 46.

In addition to the pedestal 134, the latch assembly preferably also includes a rack support that is a land 86 carried by the rack holder base 76 that provides a rack support point between the rack holder 44 and rack 46. Carried by the land 86 is a generally upstanding stop plate 128 for stopping the rack 46 in the closed position such that it will not swing further toward the vehicle 42 and locates the latch pin 132 generally over the pedestal 134 so that it will be received in the pedestal aperture 140 releasably latching the rack 46 in the closed position.

To swing the rack 46 away from the closed position, a handle 142 of the latch pin 132 is grasped and pulled upwardly to remove the pin 132 from the aperture 140. Thereafter, the rack 46 can be urged away from the rear of the vehicle 42.

Figure 19:
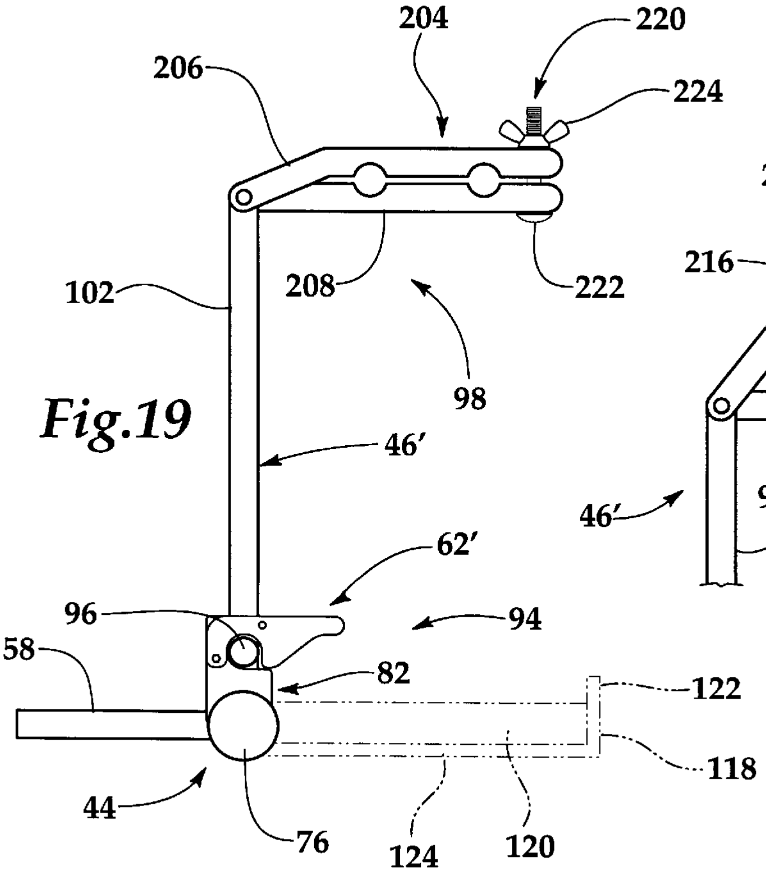
FIG. 19 illustrates a side view of the modular bicycle rack.

In another of the latch assemblies, depicted in FIGS. 7A, 7B 13–15 and 19, the latch 62' comprises a lever arm 144 pivotally coupled to a latch body 146 carried by either the rack 46 or the rack holder 44. Preferably, as is shown in FIG. 19, the latch lever 144 and latch body 146 are carried by the rack holder base 76 and are constructed and arranged to receive the swing arm truss support rail 96 of the rack 46 to releasably secure the rack 46 in the closed position.

Figure 7B:
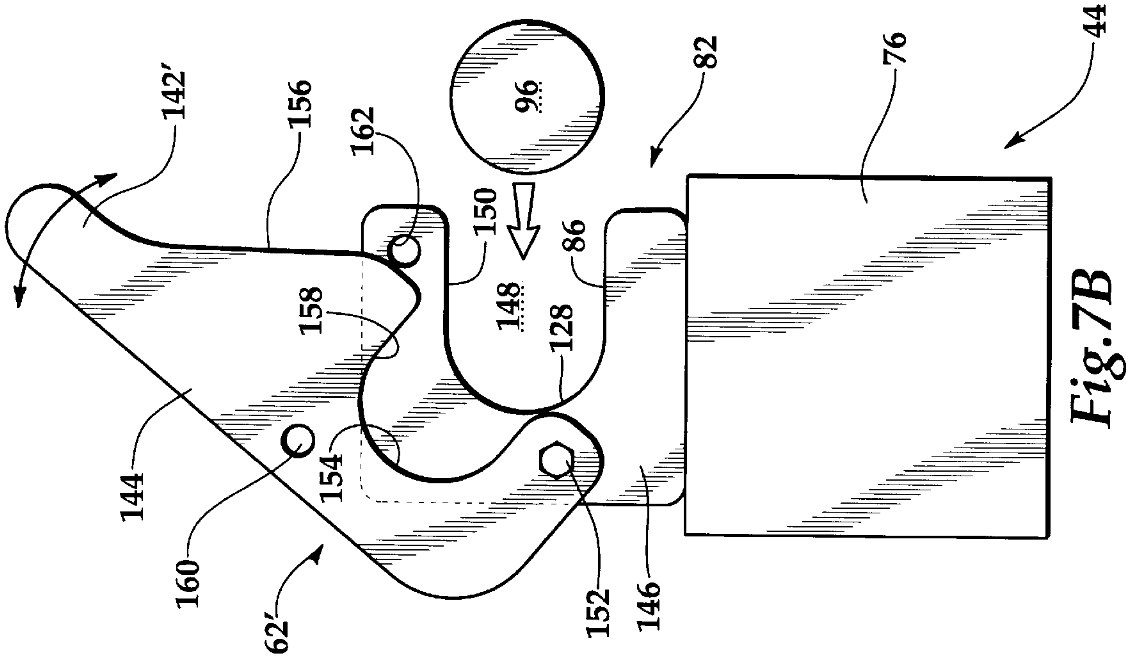
FIG. 7B illustrates a side view of the latch.
Figure 7A:
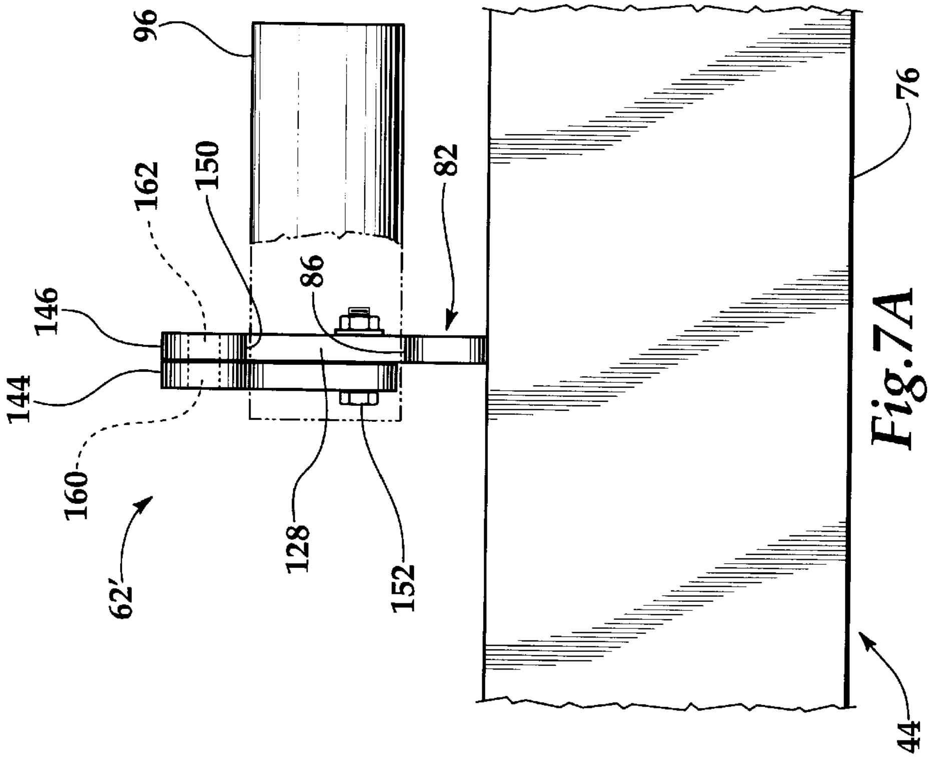
FIG. 7A illustrates an enlarged side view of a preferred latch embodiment for retaining a modular rack received on the rack holder in the closed position.

Referring to FIGS. 7A and 7B, the latch body 146 is of generally U-shaped construction and is affixed to the base 76 of the rack holder 44 such as by welding. The U-shaped construction of the latch body defines a saddle 148 for receiving the swing arm truss support rail 96. The bottom edge of the saddle 148 preferably also functions as a land 86 upon which the support rail 96 bears when received in the latch 62' to provide a support point between the rack 46 and rack holder 44. The rear edge of the saddle 148 functions as a stop surface 128 for stopping the rack 46 in the closed position thereby preventing the rack 46 from moving further toward the vehicle 42. The top edge 150 of the saddle 148 and top portion of the latch body 146 help to prevent the rack 46 from separating from the rack holder 44 in an upward direction relative to the rack holder 44, such as what can happen should the vehicle 42 hit a bump, a pothole, a rock or otherwise experience a sudden jolt.

The latch lever 144 is a generally elongate member which is pivotally attached by a pin or fastener 152 adjacent one end and which has a lift handle 142' at its opposite end. The latch lever 144 also has a generally arcuately shaped cutout portion 154 which generally encircles the swing arm truss support rail 96 when the rail 96 is completely received in the saddle 148 of the latch body 146.

To permit entry of the rail 96 into the saddle 148 of the latch body 146, the leading edge of the latch lever 144 is inclined forming a ramp 156 that rides along the top of the rail 96 as the rail 96 begins to approach the saddle 148 pivoting the latch lever 144 upwardly thereby allowing the rail 96 to be received in the saddle 148.

To prevent removal of the rail 96 from the saddle 148, the latch lever 144 drops down when the rail 96 is received in the saddle 148 causing the cutout portion 154 to substantially encircle the upper half of the rail 96. A generally vertical forward edge 158 of the cutout 154 bears against the rail 96 to oppose its removal from the saddle 148 thereby preventing the rack 46 from swinging away from the closed position. In this manner, the forward edge 158 of the cutout 154 also prevents the latch lever 148 from displacing upwardly after it has received the rail 96 keeping the rack 46 captured in the closed position by the latch 62'.

As is shown in FIGS. 7A & 7B, the latch lever 144 can be moved between an unlatched position (FIG. 7B) allowing the swing arm truss support rail 96 to enter or leave the latch 62' and a latched position (FIG. 7A) capturing the swing arm truss support rail 96. To enable the rack 46 to be locked in the closed position, both the latch lever 144 and latch body 146 have a hole 160 & 162 which generally coaxially align when the latch lever 144 is in the latched position. To lock the rack 46 in the closed position, a pin, bolt, wire or lock is inserted through both bores 160 & 162. When the latch 62' is locked by a conventional locking mechanism, such as a padlock, theft of the rack 46 can be deterred and preferably prevented.

V. Ski Rack

Referring to FIGS. 1–3, 8–11, 13–17A, a modular ski rack 46 is shown carried on a rack holder 44 that is attached to the rear of a vehicle 42. The rack 46, whether it be of single or dual swing arm construction, is constructed and arranged to hold at least one pair and preferably as many as four pairs of skis 104 and accompanying poles 130.

Preferably, the ski rack 46 has a lower horizontal ski support cross beam 106 that extends from post 102 to the other post 102 and which lies between the upper horizontal ski support beam 100 and the swing arm truss support rail 96. Carried by one of the upper and lower ski support beams 100 & 106 are a plurality of spaced apart ski receivers 164 and ski retainers 166. Preferably, the lower ski support beam 106 has a plurality of spaced apart ski receivers 164 and the upper support beam 100 has a plurality of correspondingly spaced apart ski retainers 166.

A. Ski Receiving Cup

As is shown in FIG. 2, each ski receiver 164 preferably is a cup 164 having a recess or hollow therein for receiving and retaining one end of a pair of skis 104. The cup 164 preferably is of generally cylindrical cross section and has an axial length of at least about one inch so that the end of a pair of skis 104 or the ends of ski poles 130 can be received in the cup 164 and advantageously be retained in the cup 164 even if the vehicle 42 carrying the ski rack 46 encounters rough or bumpy terrain.

Each ski receiving cup 164 has an axial end facing downwardly toward the platform 118 and which is located adjacent the platform 118. In the ski rack 46 shown in FIGS. 1–3, the downwardly facing axial end of each cup 164 is very close to or bears against the floor 124 of the platform 118. In either event, skis 104 received in a cup 164 can be supported by the floor 124 of the platform 118. If desired, the cup 164 can have its own floor or bottom separate from the platform floor 124 which can include one or more layers of a cushioning or shock absorbing material to protect the end of each ski 104.

Each cup 164 is carried by the lower support beam 106. Preferably, each cup 164 is secured to the beam 106 such as by a fastener (FIG. 1), like a bolt and nut, a screw, a rivet, a pin, or another kind of a fastener. If desired, each cup 164 can be adhesively secured to the beam 106 or attached by some other means, such as for example, a hook and loop fastener or the like.

As is also shown in FIG. 2, cups 164 having different lengths can be secured to the lower support beam 106, such as for holding different skis 104 of different types, widths, thicknesses, and lengths. Similarly, cups 164 having different diameters can also be used. Preferably, each cup 164 has an axial length of between about two inches and about eight inches. Preferably, each cup 164 has an inner diameter of at least about three and three-quarter inches so it can receive the ends of a single pair of skis 104. Preferably, each cup 164 can be constructed having an inner diameter of about four inches and an outer diameter of about four and one-half inches so the cup 164 can advantageously receive the ends of a single pair of skis 104 and the ski poles 130 for that pair of skis 104, such as is in the manner depicted in FIGS. 1–3.

Each cup 164 is preferably constructed of a plastic, polymeric material or an elastomeric material such as PVC pipe or the like. If constructed of PVC pipe, the forming the cup 164 preferably has a sidewall thickness of at least about one-eight of an inch or greater. If desired, one or more of the cups 164 can be constructed of iron pipe, steel, stainless steel, another steel alloy, aluminum, an aluminum alloy or another metal or metal alloy.

B. Ski Receiving Bracket

Figure 17A:
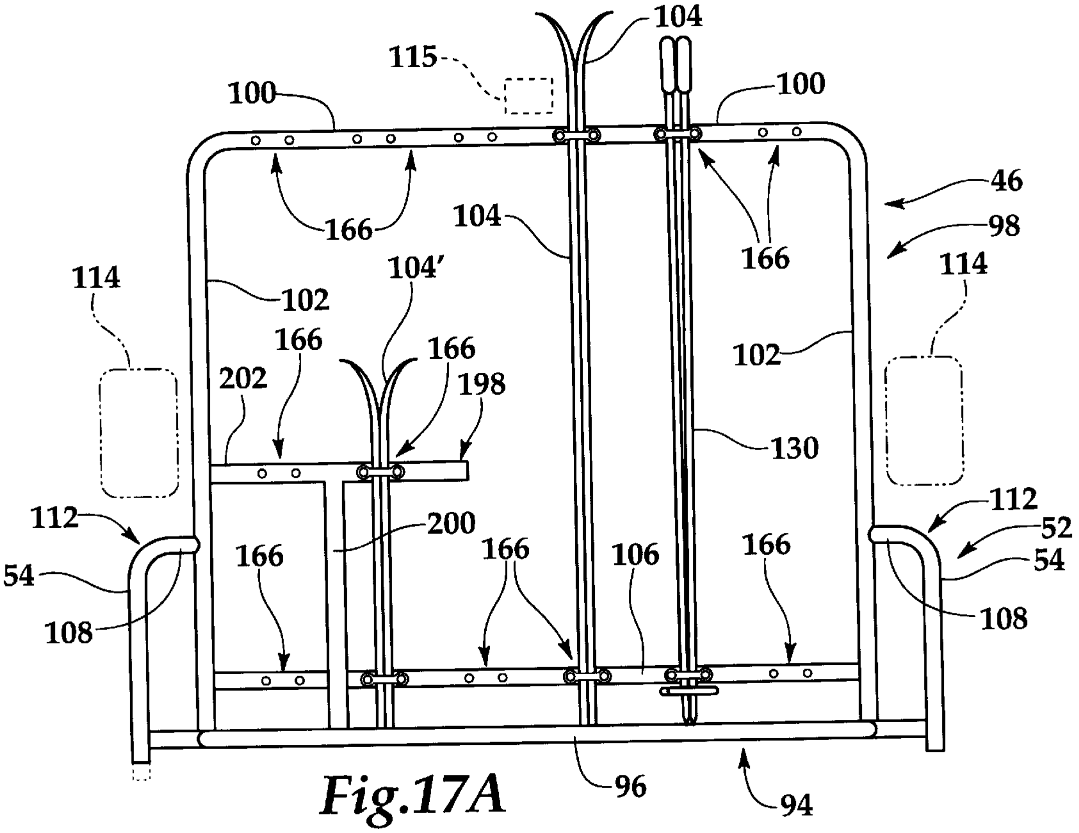
FIG. 17A illustrates the T-shaped youth ski retaining bracket assembled to a single swinging modular ski rack that has upper and lower ski retainers.
Figure 17B:
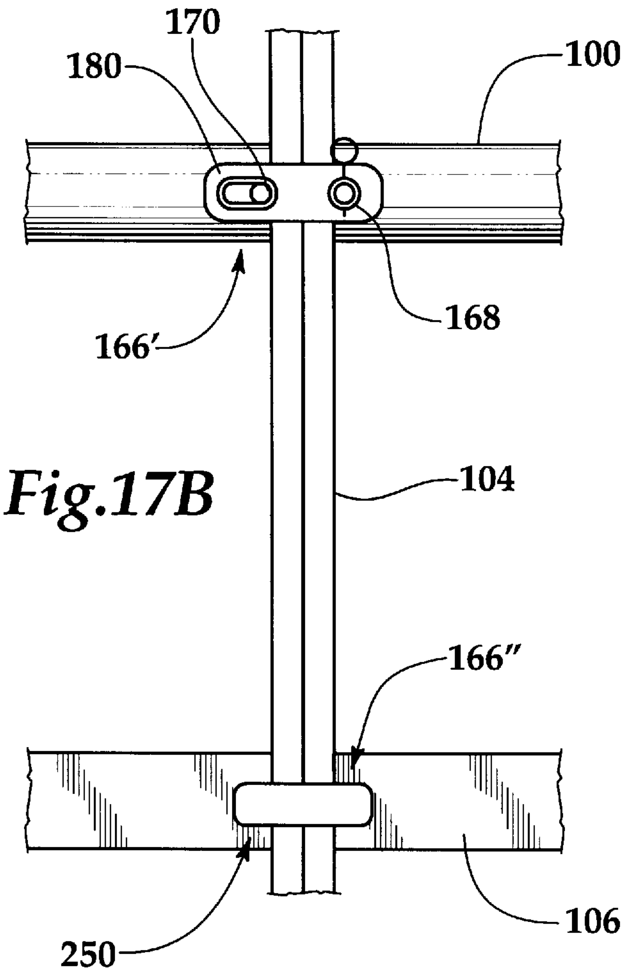
FIG. 17B illustrates the ski retainers of the ski rack in more detail.
Figure 17C:
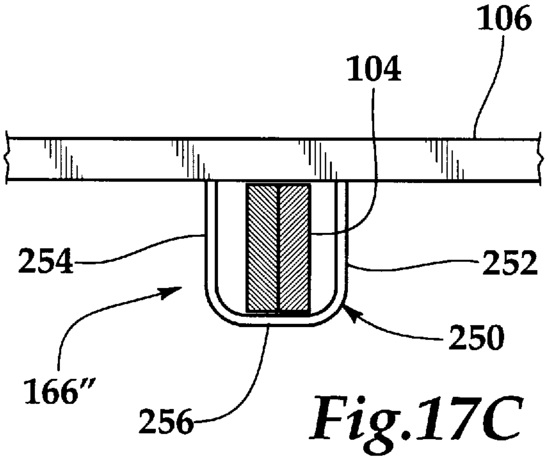
FIG. 17C depicts an enlarged top view of a U-shaped bracket ski retainer used to support and retain skis adjacent their bottom.
Figure 18:
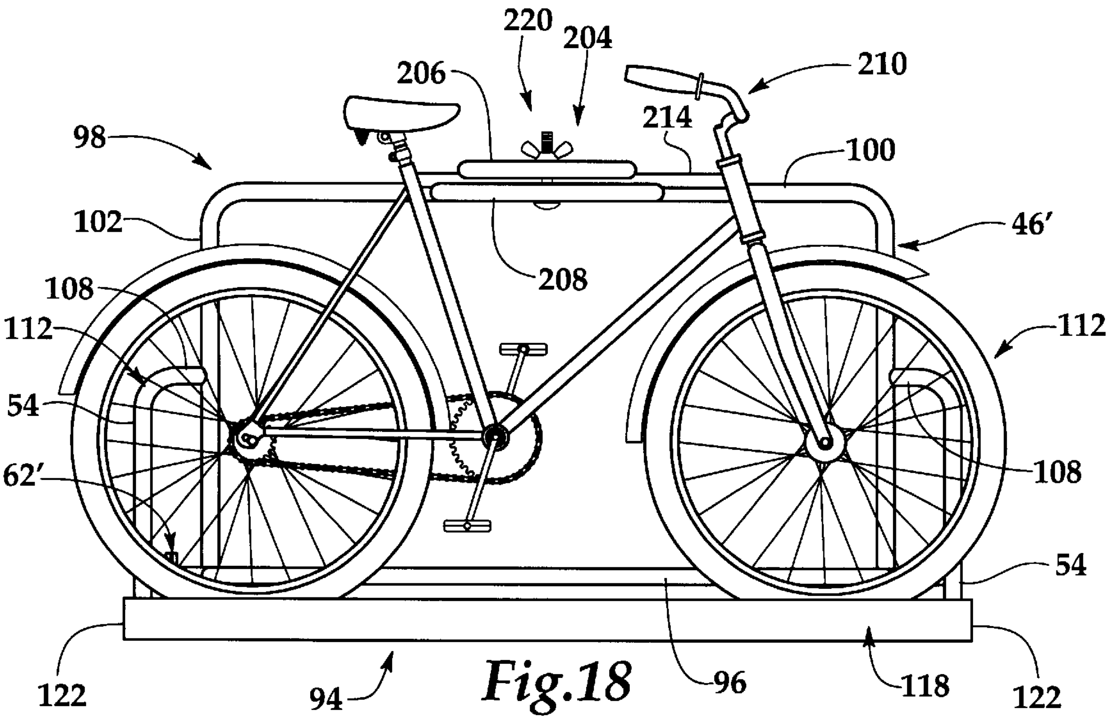
FIG. 18 illustrates a front view of a modular bicycle rack in use carrying a bicycle.

FIGS. 17B & 17C illustrate a ski receiver 166" that is a ski receiving bracket 250. The bracket 250 preferably is generally U-shaped having a pair of spaced apart legs 252 & 254 attached to the lower support beam 106 and a transverse portion 256 connecting the two legs 252 & 254. To receive conventional skis, the legs 252 & 254 are spaced apart at least about one and one-half inches and the transverse portion 256 is spaced outwardly from the beam 106 by a distance of about three inches. To receive jumping skis, the transverse portion 256 is spaced outwardly from the beam 106 by a distance of about four and one-half inches. The bracket 250 preferably is constructed of round solid steel stock having a cross sectional diameter of about 0.375 inches.

C. Ski Retainer

1) Strap Ski Retainer

Figure 8:
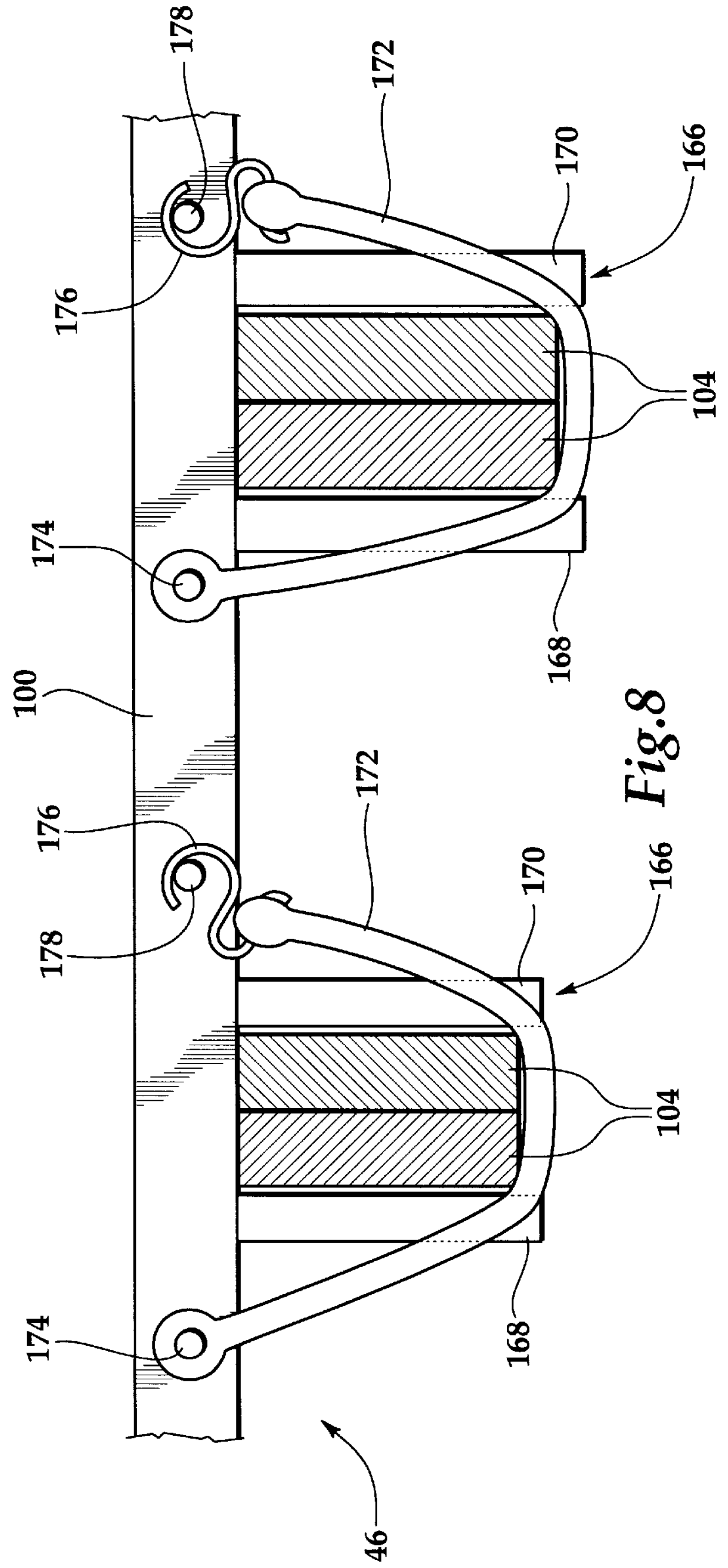
FIG. 8 illustrates a fragmentary top cross sectional view of a preferred embodiment of a pair of ski retaining assemblies.
Figure 9:
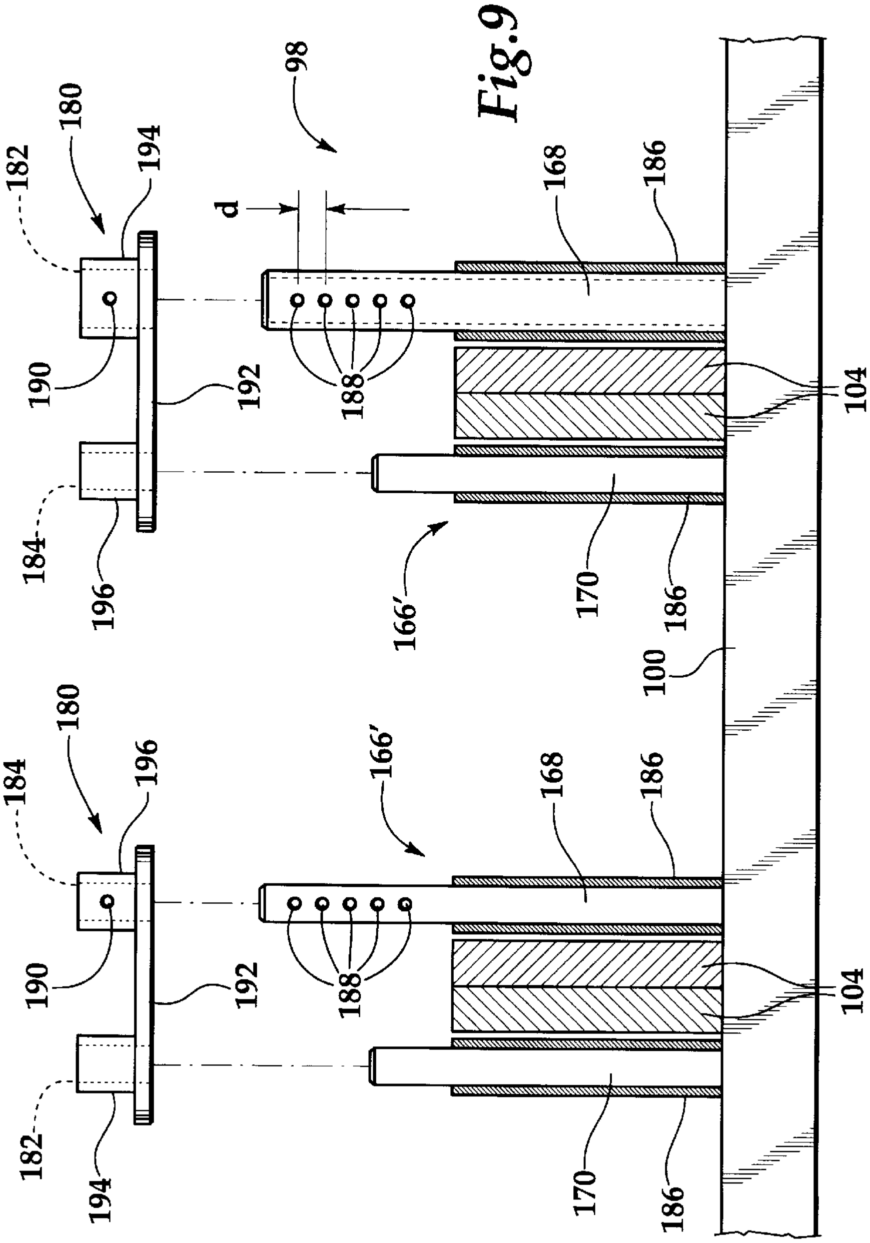
FIG. 9 illustrates a fragmentary top cross sectional view of a preferred embodiment of a pair of ski retaining assemblies.

FIGS. 8 & 9 illustrate two preferred embodiments of a ski retainer 166 for retaining a pair of skis 104 carried by the rack 46. In the first preferred embodiment shown in FIG. 8, the ski retainer 166 has a pair of spaced apart pegs 168 & 170 that extend outwardly from a horizontal ski support beam 100 or 106. The pegs 168 & 170 are spaced apart a distance sufficient to receive a pair of skis 104 between them. Referring to FIG. 8, the pegs 168 & 170 are spaced apart by a distance that is at least slightly greater than the thickness of two skis 104 stacked together in the manner shown in FIG. 8.

To prevent the finish of the skis 104 from being marred, nicked or scratched, each peg 168 & 170 is either constructed of a material that will not mar or scratch the finish of a ski 104 or is covered with such a material. For the pegs 168 & 170 shown in FIG. 8, each peg preferably is covered by an outer sleeve of rubber, plastic or foam material for preventing damage to the finish of skis 104 retained between the pegs 168 & 170.

Each peg 168 & 170 preferably is constructed of a metal, such as iron, steel, a steel alloy, aluminum, an aluminum alloy or the like. For example, the finger 168 & 170 can be a bolt that is directly affixed to a support beam 100 or 106 or which extends through a bore in the support beam and is threadably secured to the support beam by a nut.

With one or a pair of skis 104 received between the pegs 168 & 170, a strap 172 is passed around the skis 104 in the manner shown in FIG. 8 to retain them between the pegs 168 & 170. The strap 172 has one end adjacent one of the pegs 168 secured to the support beam 100 or 106 and can be releasably attached at its other end to the beam adjacent the other of the pegs 170. If desired, the strap 172 can be connected directly from one peg 168 to the other peg 170 to close the mouth, opening or entry between the pegs 168 & 170 such that when a single ski 104 or a pair of skis 104 is received between the pegs 168 & 170, they are retained between the pegs 168 & 170.

For the strap 172 shown in FIG. 8, one end of the strap 172 is attached to an anchor 174 adjacent one ski retaining peg 168 directly to the beam and the other end has a generally S-shaped hook 176 that can be releasably secured to another anchor 178 adjacent the other peg 168, enabling the strap 172 to releasably retain a pair of skis 104 between the pegs 168 & 170. Each strap anchor 174 & 178 preferably is an upstanding rivet, pin, boss or another projection capable of engaging part of the strap 172.

The strap 172 preferably is constructed of a flexible material that is a rubber, a plastic, a polymer, an elastomer or another synthetic material. If desired, the strap 172 can be a belt, a chain, a wire or another type of generally flexible connector capable of closing the mouth between a pair of ski retaining pegs 168 & 170 to prevent removal of skis 104 received between the pegs 168 & 170.

While strap-based ski retainers 166 are preferably secured to the upper beam 100 to releasably retain and support skis 104 a distance away from their ends located adjacent the swing arm truss support rail 96, they can also be secured to the lower beam 106 in place of the ski receiving cups 164 to releasably mount and retain skis 104 on the rack 46. If desired, generally aligned strap-based ski retainers 166 can be mounted to both the upper and lower support beams 100 & 106 to receive and releasably retain skis 104 and ski poles 130, such as in the manner shown in FIG. 17. Preferably, the rack 46 can also be constructed as is shown in FIGS. 1–3 with ski receiving cups 164 on the bottom and ski retainers 166 on top spaced upwardly from the cups 164.

2) Cap Retainer

Figure 10:
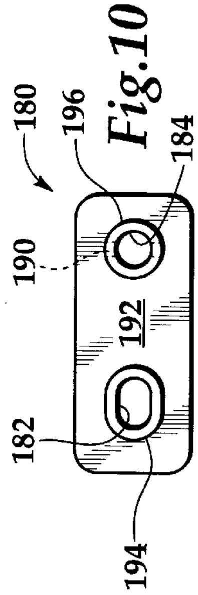
FIG. 10 shows the top view of a retainer cap of the second preferred ski retaining assembly.

FIGS. 9 & 10 illustrate a ski retainer 166' having a cap 180 that is received over the pegs 168 & 170 to close the mouth or opening between the pegs 168 & 170 to capture a pair of skis 104, a snowboard (not shown) and/or poles 130 between the pegs 168 & 170. The cap 180 has a pair of through-bores 182 & 184 each for receiving a peg for enabling the cap 180 to be placed on the pegs 168 & 170. In use, after one ski or a pair of skis 104 are received between pegs 168 & 170, the cap 180 is placed over the pegs 168 & 170.

As is shown in FIG. 9, each pair of pegs 168 & 170 of a ski retainer 166' is spaced apart a distance at least as great as the thickness of a pair of skis 104. Preferably, the pegs 168 & 170 are spaced apart such that there is a distance of at least about two inches between the inner opposing surfaces or inner radial edges of the pegs 168 & 170 to accommodate the thickness of at least two skis 104. For jumping skis, the pegs 168 & 170 are spaced apart at least about three and three-quarters (3.75) inches. Each of the pegs 168 & 170 is preferably constructed of a solid material that is a metal, such as steel, aluminum or the like which extends outwardly from a support beam 100 and/or 106 and which preferably is covered with a layer or sleeve of protective material 186 such as rubber, plastic or the like.

To releasably receive the cap 180, one of the pegs 170 preferably is longer than the other of the pegs 168. In the preferred ski retainer embodiments shown in FIG. 9 the longest peg 168 is at least about one-half inch longer than the shorter peg 170. To enable skis 104 of different widths to be releasably captured by a ski retainer 166' of this novel construction, each peg 168 & 170 preferably has an axial length of at least about four inches. For receiving ski jumping skis 104, which are wider than conventional skis 104, the pegs 168 & 170 preferably are at least about four inches long thereby also flexibly enabling the retainer 166' to receive and retain both conventional skis 104 and ski jumping skis 104. The pegs 168 & 170 can be constructed having different diameters, such as is depicted in FIG. 9. If the pegs 168 & 170 are of a length designed to accommodate jumping skis and conventional skis are received between the pegs 168 & 170, a cap 180 can be modified with a spacer (not shown) that substantially fills any void between the conventional skis 104 and the cap 180 to prevent the skis 104 from moving around during transport.

If the pegs 168 & 170 are to accommodate a snowboard (not shown), each peg 168 & 170 preferably is substantially longer than it would be if it were simply holding skis 104. For example, if a snowboard having an eight inch width is to be retained by a rack 46, each peg 168 & 170 will be longer than eight inches so that the snowboard can be received between the pegs 168 & 170.

To releasably secure the cap 180 to at least one of the pegs to prevent its removal to securely capture skis 104 or the like between the pegs 168 & 170, at least one of the pegs 170 has at least one small bore or detent 188 adjacent the free end of the peg 170 to enable a cap 180 received on the pegs 168 & 170 to be releasably retained on the peg 170 to prevent its removal. By preventing removal of the cap 180 in this manner, skis 104 and the like are positively retained between the pegs 168 & 170 during use and operation of the ski rack 46.

To accommodate skis 104 having different widths, at least one of the pegs 170 has at least two and preferably a plurality of spaced apart bores or detents 188, each bore or detent 188 having an axis generally perpendicular to the longitudinal axis of the peg 170. In a preferred ski retainer embodiment, there is a distance, d, of about three-eighths of an inch (0.375) between each of the bores/detents 188 to adjustably capture and retain skis 104 having a wide variety of widths. The cap 180 preferably has at least one complementary small bore 190 for receiving a detent 188 or a retainer pin (not shown) received in one of the bores 188 in the peg 170 to prevent removal of the cap 180 from the peg 170. If detents 188 are used, they preferably consist of an outwardly urged ball received in each bore 188 in the peg 170 to releasably engage the bore 190 in the cap 180 to releasably retain the cap 180 on the pegs 168 & 170.

As is shown in FIGS. 9 & 10, the cap 180 includes a base portion 192 that extends between the pegs 168 & 170 when the cap 180 is mounted over the pegs 168 & 170 to close the opening between the pegs 168 & 170. Projecting outwardly from the cap base 192 is a collar 194 & 196 generally encircling each bore 182 & 184. At least one of the bores 182 and collars 194 preferably can be of generally oval cross section for accommodating some mislocation of one of the pegs 170 or 168 of a ski retainer 166'. To keep the cap 180 associated with the rack 46 when not in use, the cap 180 can be attached to some portion of the rack 46 by a wire, a stringer, a lanyard or another connector, none of which are depicted by the drawings. If desired, the cap 180 can be retained on the longest peg and simply swung away from the shortest peg to permit skis 104 to be removed from or inserted between the pegs 168 & 170.

The bore 190 in the cap 180 for enabling the cap 180 to be releasably mounted on one of the pins 170 preferably is located in one of the collars 194 or 196. The bore 190 extends completely through at least one side of the collar and, as is shown in FIG. 10, preferably extends completely through the collar thereby enabling a retaining pin (not shown) to be inserted completely through the bore 190 in the cap collar and a bore 188 in one of the pegs 168 for retaining the cap 180 on the pegs 168 & 170.

As is shown in FIG. 10, the cap 180 has a generally rectangular shape with a web of material 192 that extends from one collar 194 to the other collar 196. The cap 180 preferably is made of a durable and resilient material that preferably is generally rigid. The cap 180 can be made of metal, such as by stamping, forging, casting, die casting or the like, but preferably is made of a plastic or rubber material by molding, injection molding or the like. Examples of suitable cap materials include plastic, rubber, a polymeric material, an elastomer, a thermoplastic material, a thermoset material, a composite material, or another type of synthetic substantially non-metallic material.

In a preferred ski rack embodiment shown in FIG. 17B, the rack 46 has cap-type ski retainers 166' carried by the top beam 100 and ski retaining brackets 166" carried by the bottom beam 106.

Although cap-type retainers 166' are constructed and arranged to receive and retain skis, they can be adapted to receive and retain many other kinds of articles. For example, in the place of the skis 104 shown in FIG. 9, two or more pieces of lumber can be releasably capped between the pegs 168 & 170. Additionally, pipes, poles, rods, and other types of elongate articles or cargo can also be releasably retained between pegs 168 & 170 by a cap 180 generally of the configuration shown in FIGS. 9 & 10.

D. Youth Ski Retainer Bracket

Figure 16:
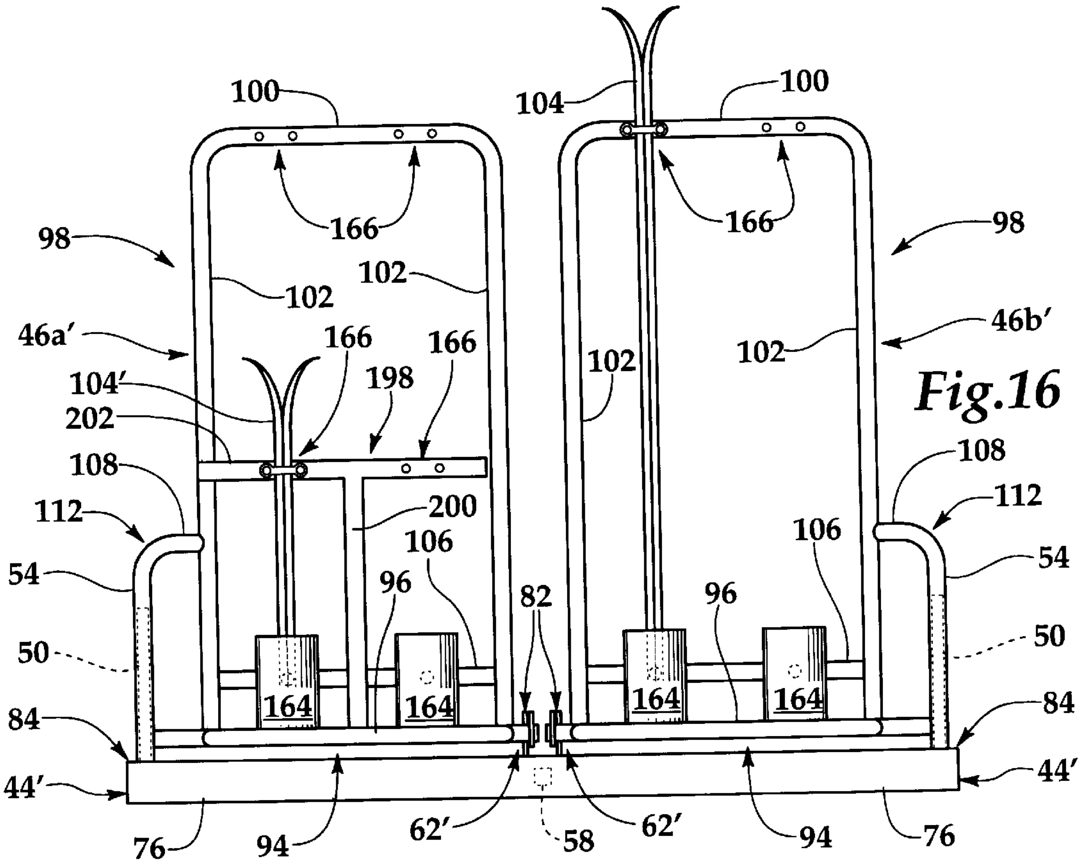
FIG. 16 depicts a generally T-shaped bracket for retaining youth skis assembled to a dual swinging ski rack of the modular rack system.

FIGS. 16 & 17A illustrate a youth ski retainer bracket 198 for receiving and retaining youth skis 104'. The bracket 198 preferably has a stem 200 that is secured to the lower beam 106 or carried by the platform 118. Extending outwardly from the top of the stem 200 is at least one and preferably a pair of arms 202 each of which carries a ski retainer 166 and/166'. The stem 200 preferably is at least about fifty or sixty millimeters inches long to accommodate the shorter length of youth skis 104' and the wide variety of youth ski lengths commercially available. The length of the pegs of any ski retainer 166 or 166' carried by the arms 202 can be suitably modified to receive and retain youth skis 104' if they are narrower than conventional skis 104.

VI. Bicycle Rack

Figure 20:
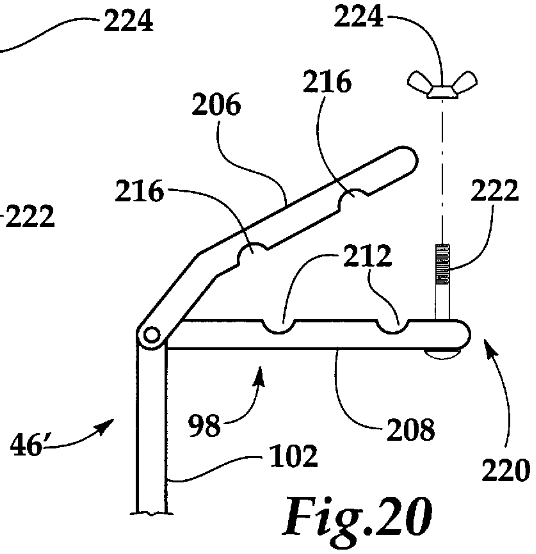
FIG. 20 is a partial fragmentary side view of a clamshell bicycle retaining clamp illustrating details of its operation.

FIGS. 18–22 depict a modular bicycle rack 46'. The bike rack 46' includes a clamshell bicycle clamp 204 having an upper jaw 206 pivotally attached to the horizontal support beam 100 of the rack 46' and a lower jaw 208 that is fixed to the beam 100 for receiving at least one two-wheeled cycle 210 between the jaws 206 & 208. Referring to FIGS. 19 & 20, the lower jaw 208 has upwardly facing notches 212 for receiving a cross bar or top tube 214 of the bike 210 and the upper jaw 206 has downwardly facing notches 216 for capturing the bike cross bar or top tube 214 when the upper jaw 206 is moved from an open position shown in FIG. 20 to its bike clamping position shown in FIG. 19.

Preferably, the bike rack 46' is constructed so as to be able to carry two bikes at one time. If desired, a bike rack 46' of this design can be constructed such that it can carry three or four bikes. If desired, the bike rack 46' can be constructed having a platform 118 underlying any bicycle 210 carried by the rack 46 to protect the bicycle(s) and serve as safety basket under the bike(s), such as the platform 118 shown in FIG. 18 and shown in phantom in FIG. 19.

Figure 22:
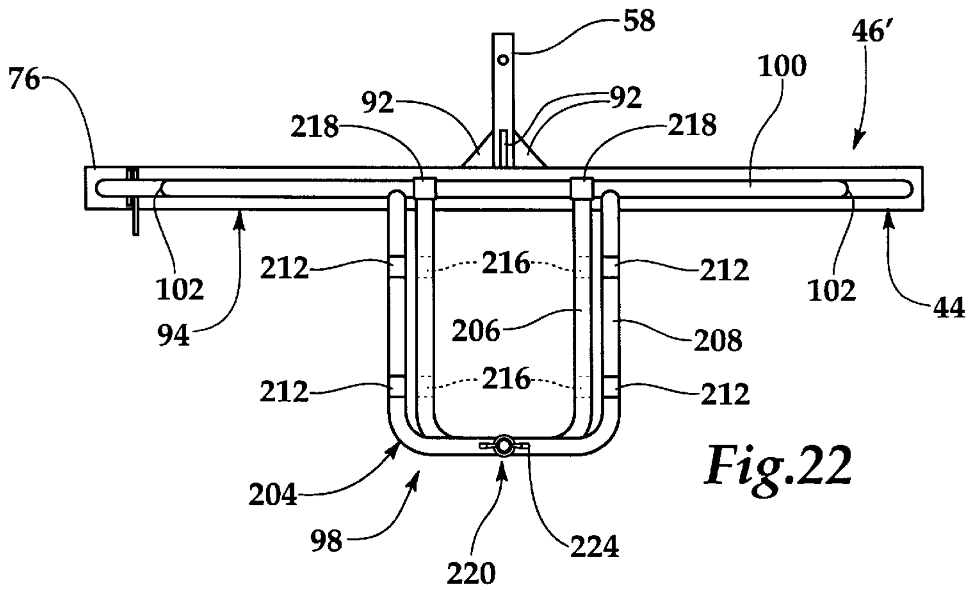
FIG. 22 is a top view of the bicycle rack received on the rack holder.
Figure 21:
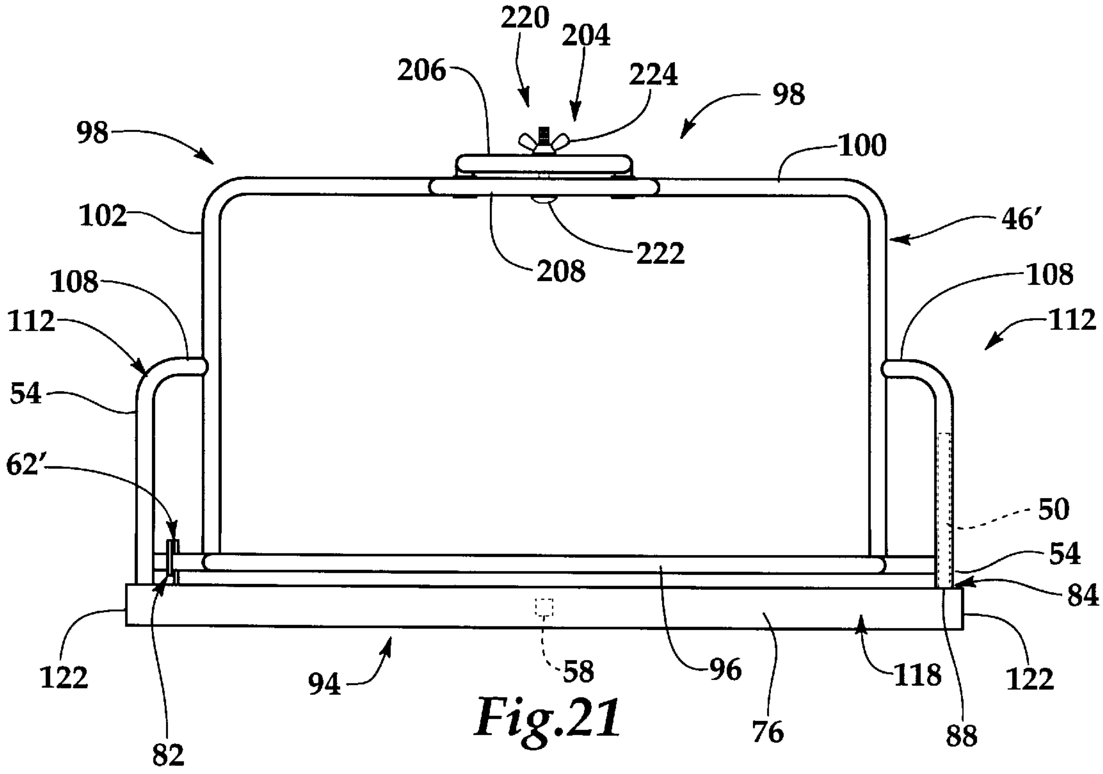
FIG. 21 is a front view of the bicycle rack assembled to a rack holder.

As is shown in FIG. 22, the lower jaw 208 is a generally U-shaped bracket that is constructed preferably of a tubular material such as tubular steel, tubular aluminum, PVC pipe or the like. The lower jaw 208 preferably is directly affixed at each end to the horizontal support beam 100 of the rack 46' such that it is immovably affixed to the beam 100. The upper jaw 206 also preferably is a generally U-shaped bracket that preferably is also constructed of a tubular material. The upper jaw 206 preferably has a knuckle 218 at each end through which the horizontal support beam 100 passes for pivotally attaching the jaw 206 to the rack 46'.

To releasably retain a bike 210 between the jaws 206 & 208 of the clamp 204, the clamp 204 has a latch 220. The latch 220 includes a through-bore through each jaw 206 & 208 that receives a threaded stud 222 which extends completely through both jaws 206 & 208 when the upper jaw 206 is in the closed position enabling a bike 210 to be releasably retained between the jaws 206 & 208. To releasably secure the jaws 206 & 208 in the closed position, a keeper 224, such as a wing nut 224, is threadably received on the stud 222. Preferably, the wing nut 224 is threaded onto the stud 222 until it bears against one of the jaws locking the jaws 206 & 208 together in the closed position and clamping the bike 210 therebetween.

VII. General Purpose Rack

Figure 23:
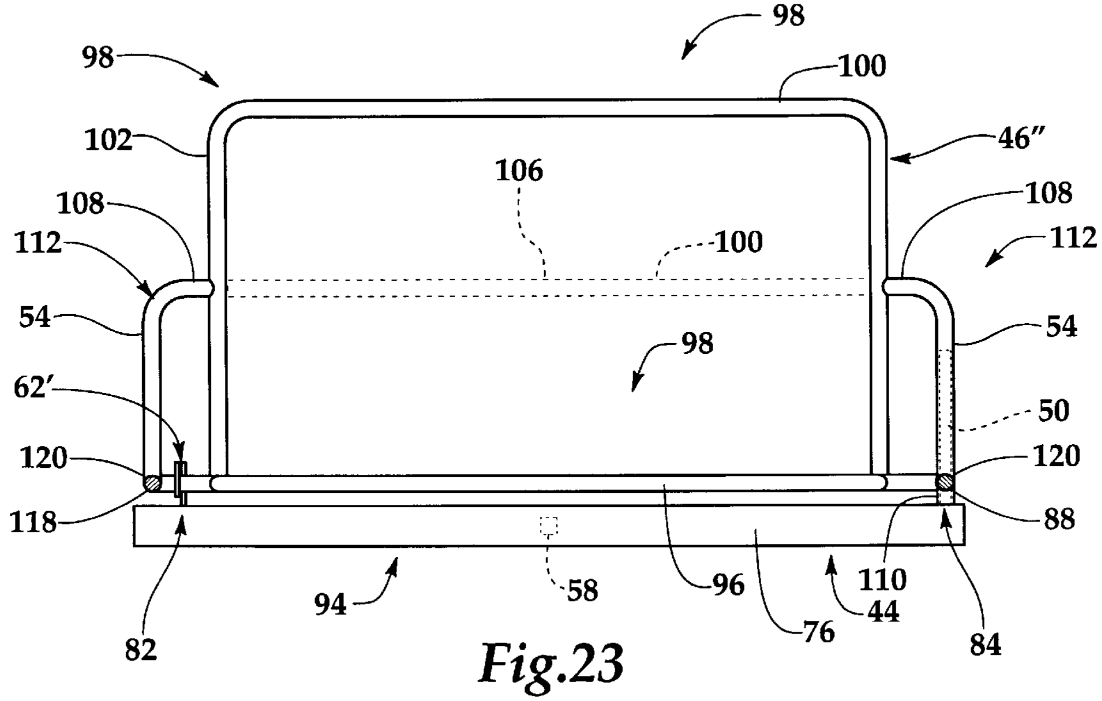
FIG. 23 is a front view of a general purpose modular rack assembled onto a rack holder with an outwardly extending cargo support platform of the rack cutaway for clarity.

FIGS. 23–25 illustrate a general purpose rack 46", such as for carrying lawn equipment 226 (FIG. 25), that has an outwardly extending platform 118 carried by the swing arm truss 94 of the rack 46". The platform 118 has a floor 124 that preferably is of meshlike construction to allow grass, dirt and other debris on lawn equipment 226 carried by the rack 46" to fall through the floor 124. Alternatively, if desired, the floor 124 can be of solid or substantially solid construction.

As is shown in phantom in FIG. 23, the generally horizontal support beam 100 can extend from adjacent one handle assembly strut 108 to the other handle assembly strut 108 to provide a lower profile rack. Additionally, although not shown, the rack 46' can have a vertically extending layer of mesh extending between the horizontal support beam 100 and vertical support posts 102 of the rack 46" to enable equipment to be hung on the mesh.

The platform includes a generally U-shaped outer frame having a pair of spaced apart legs 120 that extend outwardly from the swing arm truss 94 and an elongate front rail 122 that extends substantially parallel to the swing arm truss support rail 96. Preferably, the platform frame is of tubular construction. Although not shown, a brace or strut can extend upwardly at an angle from adjacent the outwardly extending end of each platform leg 120 to the handle assembly 112 of the rack 46" to help reinforce the platform 118.

Although the general purpose rack 46" shown has a platform 118 with a meshlike floor 124, the rack 46" can be constructed with a solid floor and upstanding sidewalls (not shown) about the periphery of the platform 118 for enabling the rack 46" to carry granular material, such as sand, dirt, gravel, rocks, and the like. If desired the rack platform 118 can be constructed such that it can be lowered while still being carried on the rack, such as electrically, hydraulically or pneumatically, for allowing relatively heavy or unwieldy objects to be loaded onto or unloaded from the rack 46".

VIII. Use and Operation

A. Use

In use, the rack system 40 of this invention provides a rack holder 44 that can accept a wide variety of racks 46, 46' & 46" tailored for a wide variety of applications and which can easily be removed or mounted on the rack holder 44 enabling quick and easy interchange of racks 46, 46' & 46". A rack system 40 of this invention includes a rack holder and modular racks which can be used with minivans (FIGS. 1–3), pickup trucks (FIG. 4), vans, cars, off-road vehicles, sport-utility vehicles, ATV's, jeeps, military transport vehicles, as well as any other type of vehicle equipped with a hitch connection 60 that preferably is either a hitch or hitch receiver. A rack system 40 of this invention is designed to be used with racks 46, 46' & 46" having a wide variety of application such as for carrying skiing equipment 104 & 130, bicycles 210, and lawn and garden equipment 226.

Although three such racks 46, 46'& 46" are depicted by the drawings, a multitude of other modular racks can be constructed for applications such as for carrying glass, paper, wood, furniture, motorcycles, ATVs, granular material, to name but a few applications, while still falling within the scope of the invention. Such racks preferably have a rack coupler 52 that is compatible with the rack receiver 48 of the rack holder 44. Preferably, the rack coupler 52 is a sleeve 54 attached to one end of a truss structure 94 that enables the rack to be easily removed from or mounted on the rack holder 44. Preferably, such a rack is constructed such that it can be swingably carried by the rack holder 44 enabling it to be releasably retained in the closed position while being movable away from the closed position to permit access to the rear 56 of the vehicle 42 carrying the rack.

Also advantageously, the ski rack 46 having dual handle assemblies 112 (FIG. 17A) is constructed such that each entire handle assembly 122 lies below an adjacent tail light 114 and the ski retainers and receivers of the rack 46 are positioned to locate skis and poles carried by the rack away from the center brake light 115 for vans, minivans, sport utility vehicles and preferably also trucks such that all tail lights 114 and brake lights 115 can be clearly viewed from behind the rack 46 and vehicle 42 with the rack 46 in the closed position. Preferably, the construction and arrangement of the bike rack 46' also does not obstruct any tail light 114 or brake light 115.

B. Operation

Referring once again to FIGS. 1–5A, the modular rack system 40 of this invention includes a rack holder 44 that is coupled to the rear 56 of a vehicle 42 such as by inserting the free end of the tongue 58 into the hitch receiver 64 shown in FIG. 4. The tongue 58 preferably is telescopically inserted into the hitch receiver 64 until its bore 70 aligns with the bore 72 in the receiver permitting a retainer to be inserted through the bores 70 & 72 so that the rack holder 44 cannot become disengaged from the vehicle 42.

Once the rack holder 44 is mounted to the vehicle 42, the modular rack 46 is grasped, preferably by its handle(s) 112 and maneuvered over the rack holder 44. The rack 46 is positioned above the rack holder 44 such that its sleeve 54 generally overlies and is generally coaxial with the pivot pin 50 of the rack holder 44. Thereafter, the rack 46 is controllably lowered such that the pin 50 of the rack holder 44 is telescopically inserted into the sleeve 54.

After the rack 46 is mounted on the rack holder 44 it can be swung about the pivot 50 until the latch assembly 62 receives the swing arm truss 94 of the rack 46, releasably latching the rack 46 in the closed position. To release the rack 46 from the closed position, the latch handle 142 of either type of latch assembly 62 or 62' is lifted and the rack 46 is pulled away from the rear 56 of the vehicle 42. When swung sufficiently far away from the rear 56 of the vehicle 42, such as is shown in FIG. 1, the rack system 40 provides substantially completely unobstructed access to the cargo receiving interior (FIG. 1) of the vehicle 42.

For example, when swung away from the rear of the minivan 42 shown in FIG. 1, the rear hatch of the minivan 42 can be extended outwardly away from the rear of the vehicle 42 without being obstructed by any portion of the rack 46 or rack holder 44 thereby permitting access to the interior of the minivan 42 through the rear hatch 43. In this manner cargo and other articles can be conveniently loaded into or retrieved from the minivan 42 while the minivan 42 is carrying the rack 46.

Similarly, the rack system 40 of this invention is well suited for use on pickup trucks 42, such as is depicted in FIG. 4, permitting the rack 46 to be swung away so that the tailgate of the truck 42 can be lowered. Also, the swinging rack feature of this modular rack system 40 is advantageous for use with cars to allow access to the trunk or rear hatch of a car as well as with other types of vehicles.

To remove the rack 46 from the rack holder 44, the rack 46 is simply grasped and pulled upwardly freeing the pivot pin 50 from the sleeve 54. Preferably, before removing the rack 46, the rack 46 is first unlatched. When unlatched, the rack 46 can be moved at least slightly away from the closed position before removing the rack 46, if desired. In this manner, racks 46, whether loaded or unloaded, can be quickly removed and interchanged with another rack 46, 46' or 46" of a similar or different application.

Advantageously, a modular rack 46 of this system 40 preferably can be loaded before being mounted on the rack holder 44, particularly if the cargo carried by the rack 46 is relatively light weight, such as for example, skis 104, poles 130 and skiboards. When removed from the rack 46 or prior to mounting on the rack 46, the rack can be pre-loaded and/or stored loaded saving time and increasing convenience.

When disengaged from the rack holder 44 and loaded with cargo, the rack 46 preferably can be stored in the loaded condition by setting the rack 46 uprightly and generally on its platform 118, such as is shown in FIG. 25. If desired, the rack 46 can be generally uprightly oriented and tipped against a wall 126 or other vertical support surface, such as is shown in FIG. 26. Of course, by storing the equipment or cargo on the rack 46 itself, storage space is conserved by not requiring separate storage space for both the equipment/cargo and the rack 46.

Advantageously, with the rack 46 removed the rack holder 44 need not be removed from the vehicle 42 and can remain on the vehicle 42 without interfering with the operation of the vehicle 42 or access to the rear 56 of the vehicle.

It is also to be understood that, although the foregoing description and drawings describe and illustrate in detail preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A load carrying modular rack system for a vehicle having a frame, a rear end, a passenger side, a driver side, and a hitch connection carried by the vehicle frame, the rack system comprising:

a) a rack constructed and arranged to carry an article;

b) a rack holder releasably coupled to the vehicle by hitch connecting means for connecting said rack holder to the hitch connection;

c) a rack receiver disposed on one of said rack and said rack holder;

d) a rack coupler on the other one of said rack and said rack holder for telescopically receiving said rack receiver and coupling said rack to said rack holder; and e) wherein said rack receiver and said rack coupler are constructed and arranged 1) to permit said rack to pivot about said rack receiver such that said rack can be swung between i) a closed position where said rack is adjacent the vehicle and said rack holder and ii) a position away from said closed position such that said rack is cantilevered from said rack holder by said rack receiver and said rack coupler, and said rack is disposed away from the vehicle permitting access to the vehicle and 2) to permit said rack to be removed from said rack holder by displacing said rack away from said rack holder such that said rack receiver telescopes completely free of said rack couplers;

f) a latch for releasably retaining said rack in said closed position;

g) wherein said rack holder has 1) a first portion extending beyond said hitch connecting means toward the passenger side of the vehicle, and 2) a second portion extending beyond said hitch connecting means toward the driver side of the vehicle; and h) wherein said rack receiver or said rack coupler is mounted on one of said first and second rack holder portions and is spaced from said hitch connection.

2. The vehicle rack system of claim 1 wherein said rack is received on top of said rack holder and said rack and rack holder are constructed and arranged such that said rack is disengaged and removed from said rack holder by lifting said rack generally upwardly relative to said rack holder and vehicle.

3. The vehicle rack system of claim 1 wherein the vehicle has a rear bumper with one end extending toward the passenger side of the vehicle and another end extending toward the driver side of the vehicle with said hitch connection disposed adjacent said rear bumper and wherein said rack receiver or said rack coupler is 1) carried by one of said rack holder portions and 2) located adjacent one of said ends of said vehicle bumper so that when said rack is disposed away from said closed position it can be urged to a position disposed away from said closed position such that said rack does not substantially obstruct access to the rear of the vehicle.

4. The vehicle rack system of claim 3 wherein the vehicle is a minivan having a rear hatch door hingedly connected to the rear of said minivan and when said rack is disposed away from said closed position said rack can be urged to a position disposed sufficiently far away from said closed position such that said rack does not obstruct access to the rear of the vehicle, said hatch door can be swung open away from the rear of said minivan without said rack interfering with the movement of said hatch door.

5. The vehicle rack system of claim 3 wherein the vehicle has a tail light adjacent the passenger side of the vehicle and above said bumper and another tail light adjacent the driver side of the vehicle and above said bumper and wherein said rack further comprises a generally horizontal truss support rail carrying said rack coupler and a pair of spaced apart article carrying posts generally upstanding from said support rail and which are located inboard of said tail lights (1) so as not to obstruct said tail lights and (2) to locate articles carried by said posts inboard of said tail lights so as not to obstruct said tail lights.

6. The vehicle rack system of claim 5 further comprising a handle assembly carried by one of said support posts and said support rail with said handle assembly constructed and arranged to be manually grasped for lifting and maneuvering said rack.

7. The vehicle rack system of claim 1 further comprising a handle assembly carried by said rack and wherein said rack coupler is located 1) adjacent said handle assembly, 2) adjacent one of the passenger side or driver side of the vehicle, and 3) spaced from said hitch connecting means, and said latch is located adjacent the other of the passenger side or driver side of the vehicle.

8. The vehicle rack system of claim 7 wherein said rack coupler is located on one side of said hitch connecting means and said latch is located on the over said of said hitch connecting means.

9. The vehicle rack system of claim 1 wherein:

a) said rack holder is coupled to the vehicle by a tongue;

b) said rack holder comprises an elongate beam carried by said tongue and which has one end extending beyond the tongue toward the driver side, forming said second portion of said rack holder, and its other end extending beyond the tongue toward the passenger side, forming said first portion of said rack holder;

c) said rack comprises a generally horizontal support rail; and d) wherein said rack receiver is carried by said rack holder base, said rack coupler is carried by said support rail, one of said rack receiver and rack coupler is an elongate pin, the other of said rack receiver and rack coupler is a sleeve, and said rack is mounted to said rack holder such that said pin is telescopically received in said sleeve.

10. The vehicle rack system of claim 9 wherein said pin is carried by said rack holder base and said sleeve is carried by said truss support rail.

11. The vehicle rack system of claim 10 wherein said pin extends generally upwardly from said base and further comprising a bearing washer carried by said base and generally surrounding said pin for helping to support said rack thereon and for functioning as a load bearing surface for facilitating swinging movement of said rack about said pin.

12. The vehicle rack system of claim 10 wherein said rack is supported by said rack holder at at least two spaced apart support points with one of said support points located on said rack holder base to one side of said tongue and the other of said support points located on said rack holder base to the other side of said tongue.

13. The vehicle rack system of claim 12 wherein one of said rack support points is located on said rack holder base to one side of said tongue and the other of said rack support points is located on said rack holder base to the other side of said tongue to create bending moments about said tongue which at least partially cancel each other.

14. The vehicle rack system of claim 10 wherein said pin has at least a portion of one end received in a bore in said rack holder base to anchor said pin to said rack holder base.

15. The vehicle rack system of claim 14 wherein said bore extends from a top surface of said rack holder base to adjacent a bottom surface of said rack holder base and said pin is anchored in at least two places to said rack holder base by welding said pin to said rack holder base adjacent its top surface and by welding said pin to said rack holder base adjacent its bottom surface.

16. The vehicle rack system of claim 10 wherein said pin has a cross sectional width or diameter of at least about one-quarter inch and extends upwardly above the top surface of said rack holder base at least about four inches for enabling said rack to be swung away from said closed position such that said rack is cantilevered from said pin.

17. The vehicle rack system of claim 16 wherein said pin is of generally cylindrical construction having a generally circular cross section and a diameter of about one inch and extends above said top surface of said rack holder base at least about ten inches.

18. The vehicle rack system of claim 17 wherein said pin is of solid construction.

19. The vehicle rack system of claim 1 wherein:

(a) said hitch connecting means is a tongue;

(b) said rack holder comprises a base that is an elongate beam transversely connected to said tongue with one end of said base extending beyond the tongue toward the driver side and carrying a generally vertically extending pivot pin, the other end of said base extending beyond the tongue toward the passenger side and carrying a generally vertically extending pivot pin, and having a pair of latch assemblies carried by said beam disposed inboard of said pivot pins;

(c) said rack comprises a first rack module having a generally horizontal truss support rail with a sleeve adjacent one end that telescopically receives one of said pivot pins and a second rack module having a generally horizontal truss support rail with a sleeve adjacent one end that telescopically receives the other of said pivot pins; and (d) wherein each said rack module is constructed and arranged to each swing outwardly about its pivot pin between a closed position where said rack module is directly adjacent the rear of the vehicle and a position disposed from said closed position that permits access to the rear of the vehicle without the rack module obstructing access to the rear of the vehicle.

20. The vehicle rack system of claim 19 wherein said rack modules and rack holder form a vehicle rack of dual swinging door construction with one of the rack modules supported by the rack holder located on one side of said tongue and the other of said rack modules supported by said rack holder located on the other side of said tongue for each of said rack modules creating bending moments in said support rail about said tongue which at least partially cancel each other to help balance said rack modules on said rack holder.

21. The vehicle rack system of claim 20 wherein each said rack module is supported on said rack holder at a support point substantially equidistant from said tongue to help balance said rack modules on said rack holder.

22. The vehicle rack system of claim 1 further comprising a support beam carried by said rack and an article retainer carried by said support beam with said article retainer comprising a pair of spaced apart pegs that extend outwardly from said support beam and a cap having a first bore for receiving one of said pegs and a second bore for receiving the other of said pegs enabling said cap to be mounted on said pegs to capture and releasably retain an article between said pegs, said support beam and said cap.

23. The vehicle rack system of claim 22 wherein one of said pegs has a plurality of axially spaced apart detents each for receiving and retaining said cap at a specific location on said peg a specific distance from said support beam for enabling the distance between said cap and said support beam to be selectively adjusted to enable said article retainer to retain articles having different sizes and widths.

24. The vehicle rack system of claim 23 wherein said article is a pair of skis and said article retainer is a ski retainer.

25. The vehicle rack system of claim 1 wherein said rack comprises a generally horizontal support rail, a beam carried by said rail, an article retainer carried by said beam, and a platform extending outwardly from said support rail and generally underlying said article retainer with said platform disposed between said article retainer and the ground for functioning as a safety basket to prevent an article retained by said article retainer from coming into contact with the ground.

26. The vehicle rack system of claim 25 wherein said platform is constructed and arranged to support said rack in a generally upstanding manner on the ground when said rack is removed from said rack holder and placed on the ground.

27. The vehicle rack system of claim 26 wherein said rack is constructed and arranged to function as a storage module to store articles carried by said rack without requiring the articles to be removed when said rack is removed from said rack holder.

28. The vehicle rack system of claim 1 wherein said rack further comprises a generally horizontal truss support rail having at least one generally upstanding support post and a clamshell article carrier carried by said support post with said clamshell article carrier having a fixed lower jaw extending generally outwardly and a pivotally mounted upper jaw extending generally outwardly with said upper jaw movable between a closed position where said upper jaw bears against said lower jaw to clamp an article between said jaws.

29. The vehicle rack system of claim 28 further comprising at least one notch in said upper jaw that generally overlies at least one notch in said lower jaw when said upper jaw is in said closed position for receiving and clamping a bike therebetween.

30. The vehicle rack system of claim 29 further comprising a latch for releasably retaining said upper jaw against said lower jaw in said closed position.

31. The vehicle rack system of claim 1 wherein said rack coupler comprises an elongate pin and said rack receiver comprises a sleeve.

32. The vehicle rack system of claim 31 further comprising a bearing washer carried by said pin against which an end of said sleeve bears.

33. The vehicle rack system of claim 31 wherein said pin is carried by said rack holder, said sleeve is carried by said rack, and said sleeve comprises a handle for lifting said rack free of said rack holder.

34. A load-carrying modular rack system for a vehicle having a frame, a rear end, a passenger side, a driver side, and a hitch connection carried by the vehicle frame, the rack system comprising:

a) a rack holder having a tongue releasably coupled to the hitch connection and a support base that is an elongate beam secured to said tongue and oriented generally transverse to said tongue with one end of said beam extending outwardly of said tongue and including a pin adjacent said end;

b) a modular rack for carrying cargo or equipment having a support rail carrying an article supporting truss structure with said support rail having a sleeve adjacent one end that is telescoped over said pin to releasably pivotally mount said rack on said rack holder in a manner that permits said rack to be swung about said pin relative to the rear of the vehicle on said rack holder; and c) wherein 1) removal of said rack is accomplished by lifting said rack away from said rack holder until said pin disengages from said sleeve and 2) mounting of said rack on said rack holder is accomplished by i) maneuvering said rack over said rack holder until said sleeve generally overlies and is coaxial with said pin and ii) thereafter moving said rack toward said rack holder such that said sleeve telescopes over said pin.

35. The vehicle rack system of claim 34 wherein a) said rack can be swung about said pin between 1) a closed position where said rack is adjacent the rear of the vehicle and 2) a position disposed from said closed position and away from the rear of the vehicle permitting access to the rear of the vehicle;

b) said rack holder base has a top surface and said pin extends upwardly from said top surface of said rack holder base; and c) further comprising a bearing washer carried by said pin above said top surface of said rack holder for helping to carry the weight of said rack when said rack is swung about said pin such that said rack is substantially cantilevered from said pin.

36. The vehicle rack system of claim 34 wherein said rack holder is constructed of steel and said pin is constructed of solid round steel stock having a diameter of about one inch and which extends upwardly from said rack holder base at least about four inches with said pivot pin connected to said rack holder base by at least one weld such that said rack is cantilevered from said pin when said rack is swung away from the rear of the vehicle.

37. The vehicle rack system of claim 34 further comprising a) at least one upstanding support post extending upwardly from said support rail of said rack, b) a cross beam attached to said support post and c) an article retainer comprising 1) a pair of spaced apart pegs that extend outwardly from said horizontal cross beam and 2) a cap received on said pegs that can be selectively positioned at varying distances from said cross beam by 3) a retainer which is received through i) a bore in said cap and ii) a bore in one of said pegs to enable articles of different sizes to be retained between said pegs, beam, and said cap.

38. The vehicle rack system of claim 34 wherein said sleeve further comprises a handle that can be grasped to lift and maneuver said rack.

39. The vehicle rack system of claim 34 comprising 1) a first modular rack constructed and arranged to carry a first kind of load, equipment or article and 2) a second modular rack constructed and arranged to carry a second kind of load, equipment or article.

40. The vehicle rack system of claim 39 wherein one of said racks is constructed and arranged to carry at least one pair of skis and the other of said racks is constructed and arranged to carry at least one bicycle.

41. The vehicle rack system of claim 34 further comprising a bore in said rack holder base for receiving one end of said pin therein and said pin is received in said bore helping to anchor said pin to said rack holder base.

42. The vehicle rack system of claim 41 wherein (a) said rack holder base has an upper surface and a lower surface and said bore extends from said upper surface to said lower surface;

(b) said pin has one end received in said bore and is attached to said rack holder base adjacent said upper surface of said rack holder base and is attached to said rack holder base adjacent said lower surface of said rack holder base to securely anchor said pin to said base.

43. The vehicle rack system of claim 41 further comprising:

a) said bore in said rack holder base extending completely through said rack holder base;

b) said pin received in said bore in said rack holder base and having 1) a portion of said pin and its top end extending upwardly above said rack holder base, and 2) a portion of said pin and its bottom end extending downwardly below said rack holder base with said downwardly extending portion of said pin having a groove defining a load supporting shoulder; and c) a support arm having 1)an elongate brace with one end pivotally coupled to said downwardly extending portion by a collar having a generally radially inwardly extending rib received in and engaging said groove and 2) a bracket at the opposite end of said brace that is operably connected to said support rail of said rack a distance from said sleeve.

44. The vehicle rack system of claim 34 wherein said pin extends from said rack holder base at least about four inches and said rack holder sleeve has a hollow therein long enough to telescopically receive said pin such that no fastener is required to retain said rack on said rack holder.

45. The vehicle rack system of claim 44 further comprising a latch carried by said rack holder base spaced from said pin and having a lever arm pivotally connected to a latch saddle carried by said rack holder base with said saddle having a recess constructed and arranged to receive said support rail of said rack to releasably retain said rack in said closed position by said lever arm capturing said support rail when said support rail is received in said latch saddle recess.

46. The vehicle rack system of claim 45 wherein said latch saddle recess is defined by a top wall that opposes upward movement of said support rail relative to said rack holder base when said support rail is received in said latch saddle recess to prevent said sleeve from telescoping free of said pin to prevent said rack from disengaging from said rack holder.

47. A modular rack system for a vehicle having a frame, a rear end, a passenger side, a driver side, and a hitch receiver carried by the vehicle frame, the rack system comprising:

a) a rack holder having a tongue releasably coupled to the hitch receiver and a support base comprising an elongate beam carried by said tongue and oriented generally perpendicularly to said tongue with said support base beam having 1) one end extending outwardly of said tongue in a direction i) generally transverse to said tongue and ii) toward the driver side, and 2) its other end extending outwardly of said tongue in a direction i) generally transverse to said tongue and ii) toward the passenger side;

b) a generally upwardly extending pivot pin carried by said support base beam 1) adjacent said end of said support base beam and 2) spaced from said tongue, said pivot pin having a cross sectional width or diameter of at least about one-half inch and an axial length extending upwardly from said support base beam of at least about four inches;

c) a rack for releasably retaining an article having a generally horizontal support rail carrying an article supporting truss with said support rail having a sleeve adjacent one end for receiving said pivot pin to releasably pivotally mount said rack on said rack holder permitting said rack to be swung about said pivot pin relative to the rear of the vehicle on said rack holder between a closed position where said rack is directly behind the rear of the vehicle and a position disposed from said closed position permitting access to the rear of the vehicle; and d) a latch in operable communication with said rack holder and said rack for releasably retaining said rack in said closed position.

48. The modular rack system of claim 47 wherein 1) said pivot pin is located adjacent said passenger side end of said support base beam, is of generally solid and round construction having a diameter of about one inch, is secured to said rack holder base by at least one weld, and extends upwardly from said rack holder base at least about ten inches to receive said sleeve of said rack to permit said rack to be swung about said pivot pin to a position disposed from said closed position such that said rack is cantilevered from said pin;

2) said rack holder further comprises a bearing washer encircling said pivot pin and carried by said base for supporting an axial end of said sleeve thereon;

3) said latch located toward said driver side on said rack holder base; and 4)i) said latch provides a rack support point on said rack holder base that is located on one side of said tongue toward either the passenger side or the driver side for supporting part of the weight of said rack and ii) said bearing washer provides another rack support point on said rack holder base that is located on the other side of said tongue toward the other of the passenger side or the driver side for supporting part of the weight of said rack.

49. A modular rack system for a vehicle having a frame, a rear end, a passenger side, a driver side, and a hitch receiver carried by the vehicle frame, the rack system comprising:

a) a rack holder having a tongue releasably coupled to the hitch receiver and a support base that is an elongate beam secured to said tongue and oriented generally transversely to said tongue with said rack beam having (1) one end extending outwardly of said tongue in a direction generally transverse to said tongue and toward the driver side of the vehicle, and (2) its other end extending outwardly of said tongue in a direction generally transverse to said tongue and toward the passenger side of the vehicle;

b) a pivot pin carried by said rack holder base adjacent one end of said rack holder base and extending upwardly from said rack holder base;

c) a rack for releasably retaining an article having a generally horizontal support rail carrying an article supporting truss with said truss including (1) a first support post extending upwardly from said rail adjacent one end of said rail, (2) a second support post spaced from said first support post and extending upwardly from said rail adjacent the other end of said rail, (3) at least one cross beam extending from one of said support posts to the other of said support posts, (4) at least one article retainer or article receiver carried by said cross beam, and (5) a sleeve extending upwardly from said rail of hollow construction for telescopingly receiving said pivot pin to releasably pivotally mount said rack on said rack holder for permitting said rack to be swung about said pivot pin relative to the rear of the vehicle on said rack holder from a closed position where said rack is directly behind the rear of the vehicle toward a position disposed from said closed position permitting access unobstructed by said rack to the rear of the vehicle; and d) a latch in operable communication with said rack holder and said rack for releasably retaining said rack in said closed position.

50. The vehicle rack system of claim 49 further comprising a platform which extends outwardly from said support rail substantially the length of said support rail and which is disposed below said article carrier wherein said platform comprises a support upon which said rack can rest on the ground when removed from said rack holder.

* * * * *